United States Patent
Mindel et al.

(10) Patent No.: US 9,283,874 B2
(45) Date of Patent: Mar. 15, 2016

(54) SHOCK ABSORBING MECHANISM WITH FEET PROTECTION FOR VEHICLE AND AIRCRAFT SEATS

(75) Inventors: Shy Mindel, Kibutz Bahan (IL); Moshe Jacob Baum, Tel Aviv (IL); Anan Hassan, Julis (IL); David Engel, Yavne (IL)

(73) Assignee: MOBIUS PROTECTION SYSTEMS LTD., Holon (IL)

( * ) Notice: Subject to any disclaimer, the term of this patent is extended or adjusted under 35 U.S.C. 154(b) by 341 days.

(21) Appl. No.: 13/123,195

(22) PCT Filed: Feb. 26, 2009

(86) PCT No.: PCT/IL2009/000220
§ 371 (c)(1),
(2), (4) Date: Jun. 8, 2011

(87) PCT Pub. No.: WO2010/041235
PCT Pub. Date: Apr. 15, 2010

(65) Prior Publication Data
US 2011/0233975 A1    Sep. 29, 2011

Related U.S. Application Data

(60) Provisional application No. 61/103,251, filed on Oct. 7, 2008.

(51) Int. Cl.
*B60N 2/42* (2006.01)
*B60N 2/24* (2006.01)
(Continued)

(52) U.S. Cl.
CPC ............... *B60N 2/4242* (2013.01); *B60N 2/24* (2013.01); *B60N 2/42709* (2013.01); *B64D 11/0619* (2013.01); *B64D 11/0689* (2013.01); *F16F 7/128* (2013.01); *Y10T 29/49615* (2015.01)

(58) Field of Classification Search
CPC ...... B64D 2011/0627; B64D 1/14; F16F 7/12
USPC .......................... 188/371, 372; 267/155–180;
297/216.17, 216.2, 216.18; 248/636
See application file for complete search history.

(56) References Cited

U.S. PATENT DOCUMENTS 1,429,580 A * 9/1922 Geiger ............................ 464/60
2,131,739 A * 10/1938 Hoyt ........................... 73/382 R
(Continued)

FOREIGN PATENT DOCUMENTS

| JP | 10-122285 A | 5/1998 |
| JP | 2001-289274 A | 10/2001 |
| JP | 2002-227898 A | 8/2002 |

OTHER PUBLICATIONS

International Search Report and Written Opinion dated Dec. 21, 2009 in International Patent Application No. PCT/IL2009/000220.
(Continued)

*Primary Examiner* — Robert A Siconolfi
*Assistant Examiner* — Mahbubur Rashid
(74) *Attorney, Agent, or Firm* — Pearl Cohen Zedek Latzer Baratz LLP

(57) ABSTRACT

The present invention discloses a method and apparatus for minimizing accelerations during impacts such as those encountered in motor vehicle accidents, helicopter and airplane crashes, explosions, and the like. The preferred embodiment takes the form of a helical spring-like member (100), designed to experience plastic deformation over a desired deformation length, under a given impact load threshold. The spring-like member is preferably installed in a mechanical linkage that is flattened under impact, straining the spring-like member in a predictable fashion. The operating characteristics of this system [namely the stress-strain curve, and thus the deformation length, impact load threshold, and acceptable load range for the system to be protected] can be easily controlled by varying the device dimensions and installation configuration.

17 Claims, 27 Drawing Sheets

(51) Int. Cl.
  *B60N 2/427*   (2006.01)
  *B64D 11/06*   (2006.01)
  *F16F 7/12*    (2006.01)

(56) References Cited

U.S. PATENT DOCUMENTS

| | | | | |
|---|---|---|---|---|
| 2,777,531 | A * | 1/1957 | Erickson | 180/270 |
| 3,068,666 | A * | 12/1962 | Sabadash | 464/60 |
| 3,535,758 | A * | 10/1970 | Hoet | 445/49 |
| 3,582,133 | A * | 6/1971 | DeLavenne | 296/68.1 |
| 3,705,740 | A * | 12/1972 | Shiomi et al. | 293/137 |
| 3,802,737 | A * | 4/1974 | Mertens | 297/216.2 |
| 4,260,143 | A * | 4/1981 | Kliger | 267/148 |
| 4,364,603 | A * | 12/1982 | Johnson | 297/84 |
| 4,542,708 | A * | 9/1985 | Holcombe et al. | 114/243 |
| 4,608,739 | A * | 9/1986 | Miller | 29/421.1 |
| 5,167,582 | A * | 12/1992 | Hunt | 464/78 |
| 5,290,089 | A * | 3/1994 | Oleszko et al. | 297/216.14 |
| 5,685,603 | A * | 11/1997 | Lane, Jr. | 297/216.11 |
| 5,690,666 | A * | 11/1997 | Berenstein et al. | 606/191 |
| 5,820,628 | A * | 10/1998 | Middleman et al. | 606/147 |
| 6,145,926 | A * | 11/2000 | Lin | 297/217.3 |
| 6,241,691 | B1 * | 6/2001 | Ferrera et al. | 600/585 |
| 6,382,318 | B1 * | 5/2002 | Whitlock | 166/278 |
| 6,488,332 | B1 * | 12/2002 | Markwald | 297/68 |
| 7,393,214 | B2 * | 7/2008 | DiStefano | 439/66 |
| 2002/0185899 | A1 * | 12/2002 | Herman et al. | 297/325 |
| 2003/0075394 | A1 * | 4/2003 | Shields et al. | 188/67 |

OTHER PUBLICATIONS

International Preliminary Report on Patentability dated Jan. 20, 2011 in International Patent Application No. PCT/IL2009/000220.

* cited by examiner

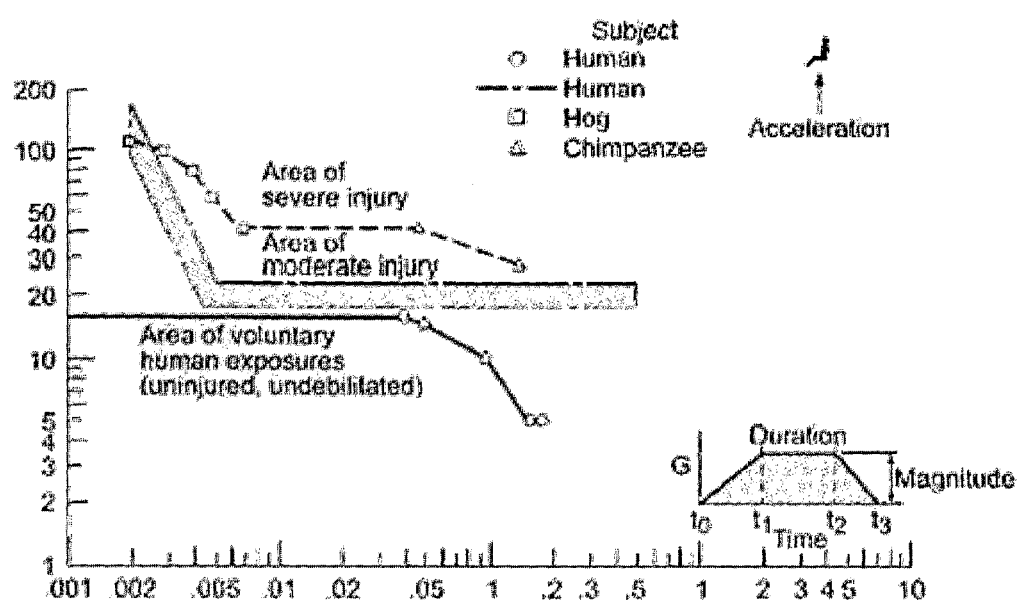
FIG. 9 – PRIOR ART

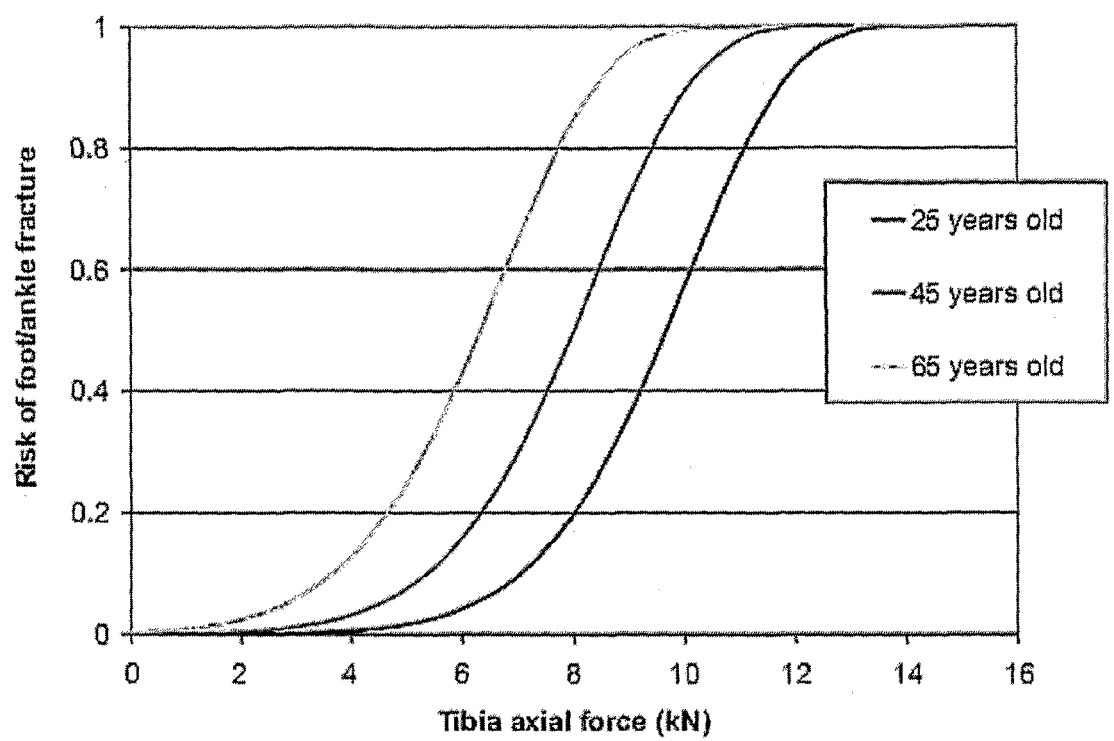
FIG. 11 – PRIOR ART

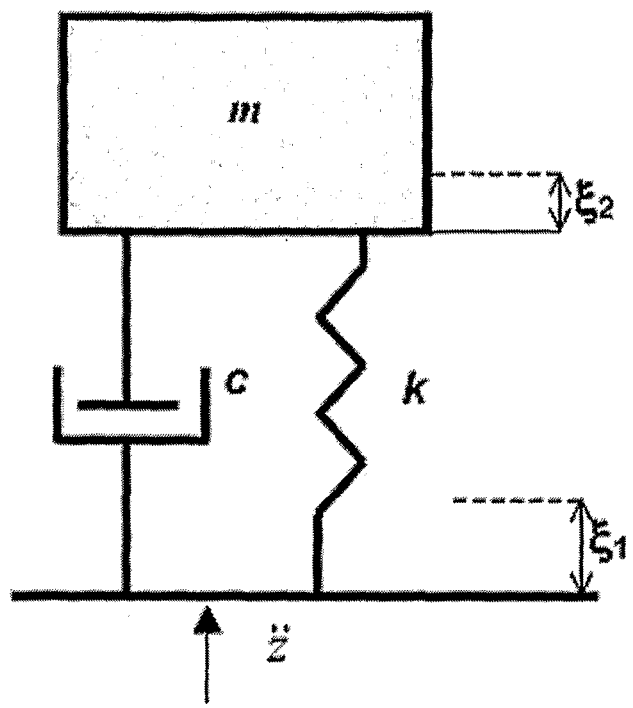
FIG. 12 – PRIOR ART

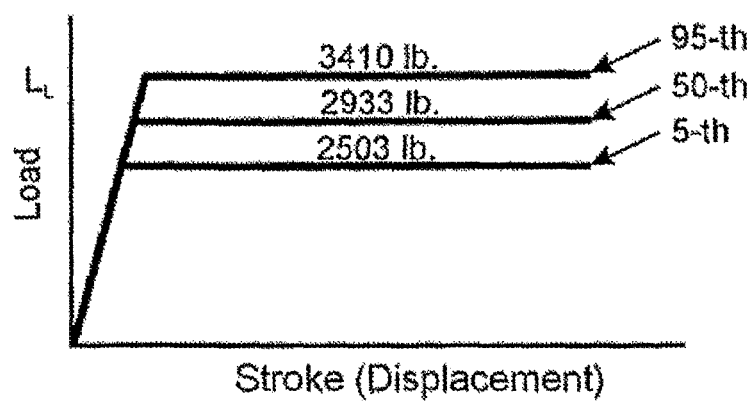
Fig. 18A – PRIOR ART
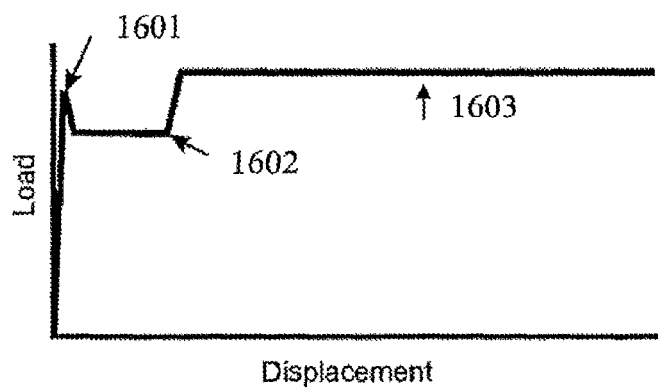
Fig. 18B – PRIOR ART

2101

1901

SHOCK ABSORBING MECHANISM WITH FEET PROTECTION FOR VEHICLE AND AIRCRAFT SEATS

FIELD OF THE INVENTION

The present invention relates to a method and apparatus for minimizing accelerations during impacts such as those encountered in motor vehicle accidents, airplane crashes, explosions, and the like.

BACKGROUND OF THE INVENTION

In situations such as vehicle collisions and explosions due to mines and IEDs, a chief cause of injury is the extreme impulses experienced; the human body has limited range of endurance for accelerations over durations of time. (See FIG. 9 for a chart of injury levels as function of acceleration in g (y-axis) vs. time (x-axis), [Eiband A. et al, 1959]). To lower the maximum impulse experienced, the distance through which the body travels when changing its initial to final velocity must be increased, or equivalently, the time during which the acceleration is experienced must be increased. For example, in a head-on collision of a vehicle with a rigid wall, the occupant's body will undergo a change from the car's initial speed to zero speed within a certain distance. The acceleration undergone is determined by the initial velocity and this distance. If this distance can be increased, the acceleration will be decreased. Care must be taken that the passengers will experience the maximum possible acceptable impulse or less, which can be accomplished by use of energy-absorbing elements of suitable design, devices to increase the travel available to the occupant, or both. The ideal energy absorber connecting a passenger to the rest of a vehicle transmits the maximum acceptable stress to the occupant or less, reaching this level after a minimum of travel. It would transmit this level of stress and no more, no matter the level of stress imparted to it. Solutions known from the prior art provide shock absorbing seats based on different types of elastic or plastic deformation or breakage of metallic components, collapsible bar mounts or columns made of metals and/or composite materials, crushable honeycomb, etc. Some available solutions present a full system including both an original seat and a built-in integrated absorbing mechanism.

For example U.S. Pat. No. 4,204,659 provides an energy absorber consisting of a conventional shock absorber in series with a rupturing diaphragm. However the stress-strain profile provided is specified to comprise an initial high peak, followed by a low valley, followed by a constant intermediate force level plateau [column 1 line 53]. It will be found that this profile is in fact suboptimal, as the ideal energy absorber reaches the maximum acceptable stress quickly and remains at this level for the total available travel. Furthermore the design relies on a conventional shock absorber and additional elements, which is a more complex design than needed for this application.

U.S. Pat. No. 5,131,470 discloses a single-event energy absorber designed for use with a so-called perforating gun in well bores. This energy absorber is designed to be deformed elastically when stressed past a certain amount, and to thereby absorb mechanical energy. Unlike a spring, the mechanical energy absorbed by such an element is released as heat and is not stored. It will be appreciated that such an energy absorber may be of use in systems designed for example to absorb shock in motor vehicle accidents. The energy absorber disclosed in '470 takes the form either of a cylinder coiled in helical fashion or a honeycomb matrix, both of which are intended to absorb energy in compression. It is the object of the current invention to absorb energy in tension, allowing for different configurations than possible for an element that absorbs energy in compression only. Furthermore the absorbers of '470 provide a certain fixed stress-strain profile which can be changed only by manufacturing elements of different parameters. It is an object of the current invention to provide a unit whose parameters are determined by a single cut introduced into the body of the device. This allows the unit to be produced in a single form in mass, and tailored to specific applications as needed.

U.S. Pat. No. 4,791,243 provides a coiled device intended for long-stroke plastic deformation and subsequent energy absorption. The device allows for a large deformation in comparison to the size of the device, e.g. the deformation may be 20 times the length of the device. It consists of a planar coiled element that stretches when subjected to a stress greater than a certain amount. However the device provides a certain fixed stress-strain profile which can be changed only by manufacturing elements of different parameters such as the planar thickness of the coil, the thickness of each turn, and the coil's outer diameter. In the applications mentioned for the device, namely the connection of electrical towers in such a way as to prevent the fall of one tower from pulling adjacent towers down, the exact stress-strain profile is more or less irrelevant, the main requirement being high deformation capability. In the case of a device intended to protect human beings in the case of crash or explosion, it is clear that the exact stress-strain curve is of paramount importance since the human body can withstand only a certain maximum stress without injury. To increase travel while still providing the same reaction force, the length of the spiral must be increased. This will therefore increase the outer diameter of the device. This increased outer diameter will increase the volume of the device. In applications where volume, height, and/or weight are limited the described patent will be at a disadvantage as compared to a device whose volume and weight does not increase to give increase travel. In the described application of strain relief for electrical towers the volume and weight of the device are largely irrelevant, but it will be appreciated that in aircraft or vehicles the allowable weight and volume of such a device will be limited.

U.S. Pat. No. 5,564,535 discloses a shock absorbing pad comprising a series of interconnected fluid reservoirs in the form of spheres partially filled with liquid. This device is designed to absorb a certain level of impact by forcing fluid from one sphere to the adjacent spheres, and for impact greater than this level to allow the spheres to rupture, thereby absorbing the shock. However it will be seen that the tunability of the stress-strain curve in this device is limited, when one considers that the ultimate stress the pad can provide is dependent upon the viscosity of the liquid within the spheres, which must take a value within a range generally far below that provided by solid materials. It is clear from the force-velocity curves provided [e.g. FIG. 5 of '535] that the ideal profile of rapidly reaching a plateau value just below the maximum acceptable force has not been attained. The device is designed to absorb energy in compression, preventing its use in applications where a tension member is necessary. Finally the planar nature of the device limits the maximum allowable travel, which in turn will limit the degree to which the device can reduce the accelerations experienced.

Similarly, U.S. Pat. No. 6,547,280 provides alternating front and rear projections, which absorb impact by plastic deformation such that the curve of stress to strain shows a plateau for example at a level of stress which does not break bone. However it will be seen that the tunability of the stress-strain curve in this device is limited, requiring manufacture of a sheet of different material or density of projections to change its stress-strain characteristics. The device is designed to absorb energy in compression, preventing its use in applications where a tension member is desired. Finally, the planar nature of the device limits the maximum allowable travel, which in turn will limit the degree to which the device can reduce the accelerations experienced.

U.S. Pat. No. 6,682,128 provides alternating 'gamma' and 'delta' structures, which absorb impact by some combination of elastic and plastic deformation. However it will be seen that the tunability of the stress-strain curve in this device is limited, requiring manufacture of a sheet of different material or depth of recess, depth of channels, inter-recess spacing, wall inclination, inter-module inclination, and/or recess shape to change its stress-strain characteristics. Furthermore the device is designed to absorb energy in compression, preventing its use in applications where a tension member is desired.

Hence it is the object of the current invention to fulfill the long felt need for a single-event energy absorber which absorbs energy in tension, which can provide a large ratio of deformation to initial size, and whose stress-strain characteristics can be tuned to those required for optimum safety performance by introduction of a single cut made into a mass-producible device.

BRIEF DESCRIPTION OF DRAWINGS

FIGS. 1A, B are sample embodiments of a helix of varying section.

FIG. 9 presents a human injury graph, depicting ranges of acceleration and duration for which human subjects will experience severe injury, mild injury, or no injury. [Eiband A, 1959, et al]).

FIG. 11 is a graph risk of foot/ankle fracture as a function of axial force on the tibia.

FIG. 12 is a representation of the mechanical model used to define the DRI index.

FIG. 18A presents a graph of the different desired load-displacement curves for different weights.

FIG. 18B presents a graph of the actual load-displacement curve for a prior art variable-load energy absorbing element.

SUMMARY OF THE INVENTION

Figure 1A:
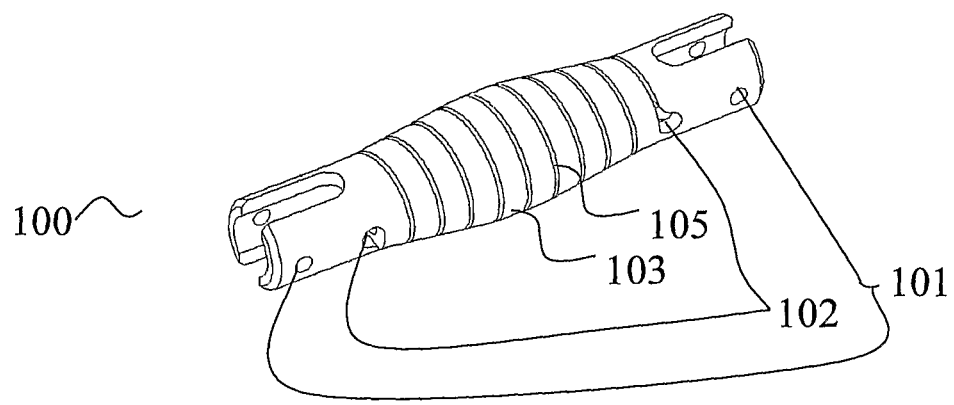
FIGS. 1A, B, C, D, E are various views of two embodiments of the energy absorbing component of the current invention.

It is within the core of the present invention to provide an energy absorbing mechanism comprising:
 a. a cylinder with a helical cut along its axis forming a helical ribbon, said helical ribbon adapted for plastic deformation in response to stresses greater than a predetermined threshold stress along said axis of said helical ribbon and
b. attachment means at the ends of said helical ribbon,
wherein the force-displacement curve of said helical ribbon is characterized by a plateau in applied force for displacements up to said ultimate displacement and further wherein there is a large ratio of the plastic regime length to the elastic regime length.

It is a further object of the invention to provide an energy absorbing mechanism as described above where said ratio of the plastic regime length to the elastic regime length lies within the range of 4-70.

It is a further object of the invention to provide an energy absorbing mechanism as described above where the material of said cylinder is chosen from a group consisting of: metal, carbon fiber, composite material, elastomer, plastic.

It is a further object of the invention to provide an energy absorbing mechanism as described above where said cross section is selected from a group consisting of rectangular, square, ellipsoidal, triangular, and circular.

It is a further object of the invention to provide an energy absorbing mechanism as described above where said attachment means are selected from a group consisting of: holes bored in the ends of said helical cylinder, threads, and pressure clamps or any other connection method known in the art.

It is an object of the invention to provide a device for protecting a seat occupant against vertical impacts, comprising:
a. a mechanical linkage mechanism configured so as to transfer said vertical impacts into vertical collapse and horizontal expansion of said mechanism;
b. one or more helical ribbons connecting points of said mechanical linkage undergoing horizontal expansion;
c. attachment means for attaching the top of said mechanical linkage to a vehicle seat, and attachment means for attaching the bottom of said mechanical linkage to the vehicle body;
wherein impacts cause vertical collapse and horizontal expansion of said mechanical linkage, causing stress to be applied to said helical ribbon, which undergoes plastic deformation to an extent and at a stress level controllable by the length, pitch, cross section, and material of said at least one helical ribbon.

It is a further object of the current invention to provide an energy absorbing mechanism as described above further comprising a foot protection mechanism in communication with said mechanical linkage adapted for raising the occupant's leg from the floor when the system reacts to impact, thereby forcing the legs upward around the thigh-pelvis axis.

It is an object of the current invention to provide a method for minimizing the acceleration of a body due to impact comprising steps of:
a. providing a cylinder;
b. cutting said cylinder along a helical path, forming said cylinder into a helical ribbon, said helical ribbon being adapted for plastic deformation in response to stresses greater than a predetermined threshold stress along the axis of said helical ribbon, and the force-displacement curve of said helical ribbon being characterized by a largely flat region followed by a steep incline in applied force for displacements up to the ultimate displacement;
c. providing attachment means at the ends of said helical ribbon,
d. controlling the ultimate displacement of said plastic deformation by varying the length and helicity of said helical ribbon;
e. controlling the predetermined threshold stress by varying the cross section and material of said ribbon;
f. Limiting the stress transferred by said impact by interposing said helical ribbon between the body undergoing said impact and the body to be protected from said impact by means of said attachment means.

It is an object of the current invention to provide a method for protecting a seat occupant against vertical impacts, comprising steps of:
a. providing a mechanical linkage configured so as to transfer said vertical impacts into vertical collapse and horizontal expansion of said mechanism;
b. providing one or more helical ribbons;
c. connecting points of said mechanical linkage undergoing relative horizontal expansion with said one or more helical ribbons;
d. providing upper attachment means for attaching the top of said mechanical linkage to a vehicle seat;
e. attaching said mechanical linkage to said vehicle seat with said upper attachment means;
f. providing lower attachment means for attaching the bottom of said mechanical linkage to the vehicle body;
g. attaching said mechanical linkage to said vehicle body with said lower attachment means;
h. absorbing impacts by means of vertical collapse and horizontal expansion of said mechanical linkage, the force of said impact transferred to said upper attachment means being determined by the force-displacement curve of said helical ribbons;
wherein said helical ribbons undergo plastic deformation to an extent and at a stress level controllable by the length, pitch, cross section, and material of said helical ribbons.

It is an object of the present invention to provide the aforementioned method, where said attachment means are selected from a group consisting of: holes bored in the ends of said helical cylinder, threads, and pressure clamps.

It is an object of the present invention to provide the aforementioned method, further provided with strain relief provision at the ends of said helical cut selected from a group consisting of: holes, or/and additional revolutions of increased stiffness.

It is a further object of the invention to provide an energy absorbing mechanism as described above incorporating a foot protection means in communication with said mechanical linkage, said foot protection means adapted for raising the occupant's leg from the floor when said mechanical linkage undergoes vertical collapse, thereby forcing the legs upward around the thigh-pelvis axis.

It is an object of the current invention to provide a method for protecting a seat occupant against horizontal impacts, comprising steps of
a. providing one or more helical ribbons;
b. providing a mechanism configured so as to transfer said horizontal impacts into expansion of said helical ribbons;
c. providing front attachment means for attaching said helical ribbons to a vehicle seat;
d. attaching said helical ribbons to said vehicle seat with said front attachment means;
e. providing back attachment means for attaching the back of said helical ribbons to the vehicle body;
f. attaching said helical ribbons to said vehicle body with said back attachment means;
g. absorbing impacts by means of horizontal expansion of said helical ribbons, the force of said impact transferred to said vehicle seat being determined by the force-displacement curve of said helical ribbons;
wherein said helical ribbons undergo plastic deformation to an extent and at a stress level controllable by the length, helicity, cross section, and material of said helical ribbons.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF PREFERRED EMBODIMENTS

When an object undergoes impact, it experiences a large acceleration which for human beings can often be injurious or fatal. The acceleration experienced depends upon the difference between initial and final velocities and the distance over which the acceleration occurs, $$a = \frac{\Delta v^2}{2d} \quad \text{Equation 1}$$

Where $\Delta v$ is the change in velocity, d is the distance over which the acceleration occurs, and a is the acceleration experienced. It will be seen that for a given $\Delta v$ (which in many cases cannot be controlled, as in a crash where a car goes from cruising speed to zero) the acceleration experienced will be decreased by increasing d. Thus allowing the passenger of a vehicle as large a degree of travel within the vehicle body as possible may decrease the accelerations experienced to a less-injurious level. Similarly if the energy of the impacting object can be reduced, its velocity will be reduced and $\Delta v$ will be decreased. In a seat intended to minimize injury from mines, the available travel d is limited. Thus given some initial and final velocities, the acceleration transmitted over the distance d should be the maximum level acceptable without causing injury, to minimize the required travel and therefore volume of the system. By designing the system this way one decreases the probability of a sudden injurious acceleration when the device reaches the end of its travel. In 'The Evolution of Energy Absorption Systems for Crashworthy Helicopter Seats', Stanley Desjardins writes:

The evolutionary process of energy absorbers for crashworthy seating has passed through several generations of development and sophistication. The first generation was the Fixed Load Energy Absorber (FLEA) that provided a constant load with stroke. The second generation consisted of two separate types both developed to achieve increased efficiency.

The first was the Variable Load Energy Absorber (VLEA) developed to allow the limit load of the device to be varied to match the weight of the specific occupant and to thus provide equal protection to all occupants regardless of weight.

The second was the Fixed Profile Energy Absorber (FPEA) which was developed to increase the seat's stroking efficiency, and specifically, to use less stroke. This option of course was attractive, especially to civil helicopter operators as it used less of the available space in the cabin of the helicopter.

The third generation, the Advanced Energy Absorber, or AEA attempted to combine all of the desirable features of the first two generations. It combined the advantages of the Variable Load Energy Absorber with that of the Fixed Profile. It goes further in that it eliminates the possibility of human error in setting the device for the appropriate occupant weight by performing the weighing function and the adjustment function automatically. Conceptually it is the ultimate energy absorbing system providing the optimum protection to all occupants regardless of their weight. It is rather complex which may discourage its use, at least in the immediate future, until a more detailed producibility design effort has been performed on the concept as applied to a specific seat system. When the complexity has been reduced to warrant the benefit to be derived on a cost benefit-basis, it will provide the best protection that can be achieved in these types of crashworthy seats.

It is one object of the present invention to provide an AEA, in the sense explained in the preceding paragraph, of simplified design. The ultimate aim of such devices is to reduce insofar as possible the risk of injury to the seat occupant.

In FIG. 9, injury levels are presented as a function of acceleration [y-axis, in g's] and duration [x-axis, seconds]. One may appreciate from this chart that injury is a result of a certain minimum acceleration experienced over certain duration. Injury is avoided if the accelerations are low enough and/or the durations are small enough that the 'injury zones' of FIG. 9 are avoided. It will be understood by one familiar with the field that this is a representative graph, and different regions may become evident with different research.

The Abbreviated Injury Scale or AIS has been developed to quantitatively assess severity of injury, as shown in the following table [AIS, 1990]:

TABLE 1

| AIS level | Injury description |
| --- | --- |
| 1 | Minor |
| 2 | Moderate |
| 3 | Serious |
| 4 | Severe |
| 5 | Critical |
| 6 | Maximum (currently untreatable) |
| 9 | Unknown |

As an example of the use of this scale, the NATO Research and Technology Organization (RTO) Final Report of HFM-090 Task Group 25 indicates that it has been decided that a 10% risk of AIS 2+ (AIS 2 or more) injuries will be accepted as pass/fail criterion for the armored vehicle (AV) mine strike tests. FIG. 11 presents Foot/Ankle Injury Risk Curves for 25, 45 and 65 year old subjects—[Yoganandan, N., et al, *Dynamic Axial Tolerance of the Human Foot-Ankle Complex*, 962426, Society of Automotive Engineers, Warrendale, Pa., USA. 1996] Based on the curves shown in FIG. 11, the maximum allowable force value (in the sense defined above) for 25, 45 and 65 year old subjects are respectively 7.0, 5.4 and 3.8 kN, representing 10% risk of foot/ankle fracture (AIS 2+). To protect most of the population in military vehicles (having an estimated age range of 20 to 45 years old), a final pass/fail value of 5.4 kN (for 45 years old) was chosen by the TG-25.

Another useful quantitative measure for studies of injury abatement is called the dynamic response index or DRI. This index is based on the physical system shown in FIG. 12. This system comprises a mass m connected to a base by means of a spring of spring constant k and a dashpot of constant c. An acceleration in the z direction of $\ddot{z}$ will result in a motion described by, $$\ddot{z} = \ddot{\delta} + 2\zeta\omega\dot{\delta} + \omega^2\delta \qquad \text{Equation 2}$$

where $\delta$ is the relative displacement of the system ($\delta = \xi_1 - \xi_2$—see FIG. 11), $\zeta$ is a damping coefficient where $$\zeta = \frac{c}{2m\omega},$$

and $\omega$ is the natural frequency $$\omega = \sqrt{\frac{k}{m}}.$$

The DRI is calculated by means of the formula, $$DRIz = \frac{\omega^2 \delta_{max}}{g} \qquad \text{Equation 3}$$

The DRI can also be used to quantify acceptable levels of injury. For example the NATO task group mentioned above specifies a maximum DRI of 17.7 (corresponding to 10% risk of AIS level 2 or above).

It is one aim of the following invention to present a system and method for injury abatement based on a novel energy-absorbing seat.

Figure 1B:
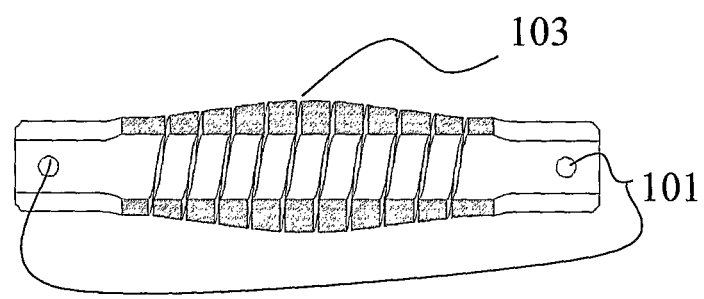
FIGS. 1C, D, E are samples embodiments of a helix of uniform section.
Figure 1C:
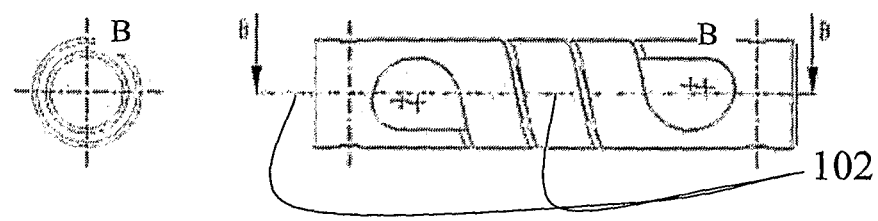
Figure 1D:
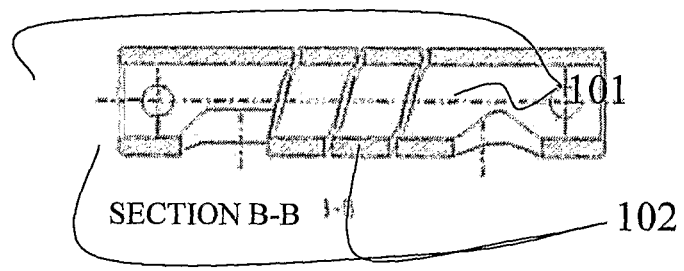
Figure 1E:
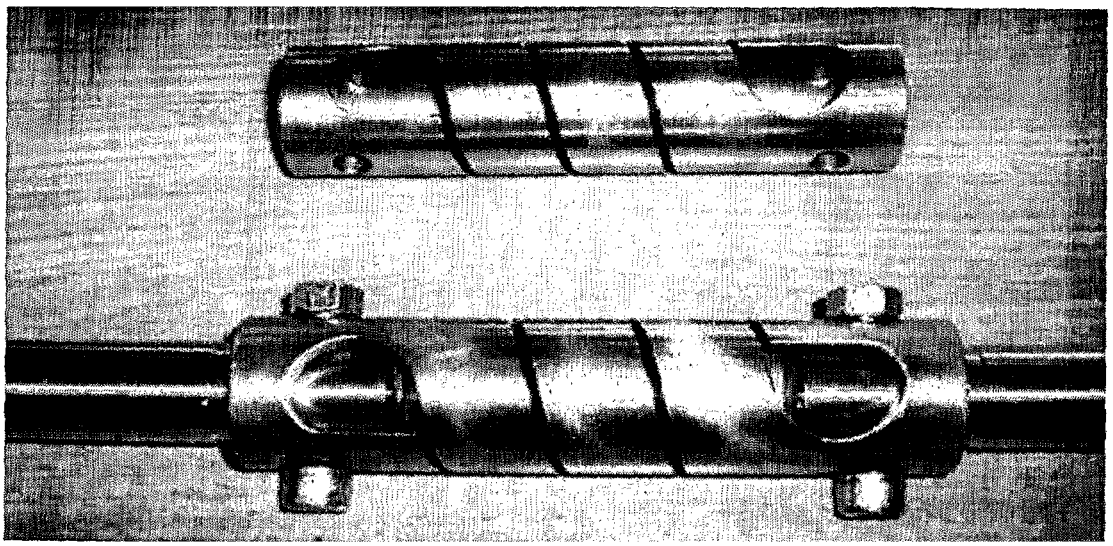
Figure 2A:
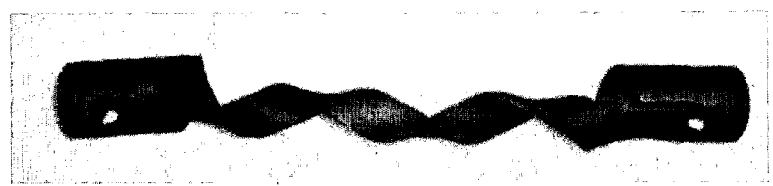
FIGS. 2A,B are a photograph and simulation of the stress field, respectively, of one embodiment of the energy absorbing component of the current invention, after it has been stressed sufficiently to reach its ultimate travel. The scale of stress in FIG. 2B is MPa.
Figure 2B:
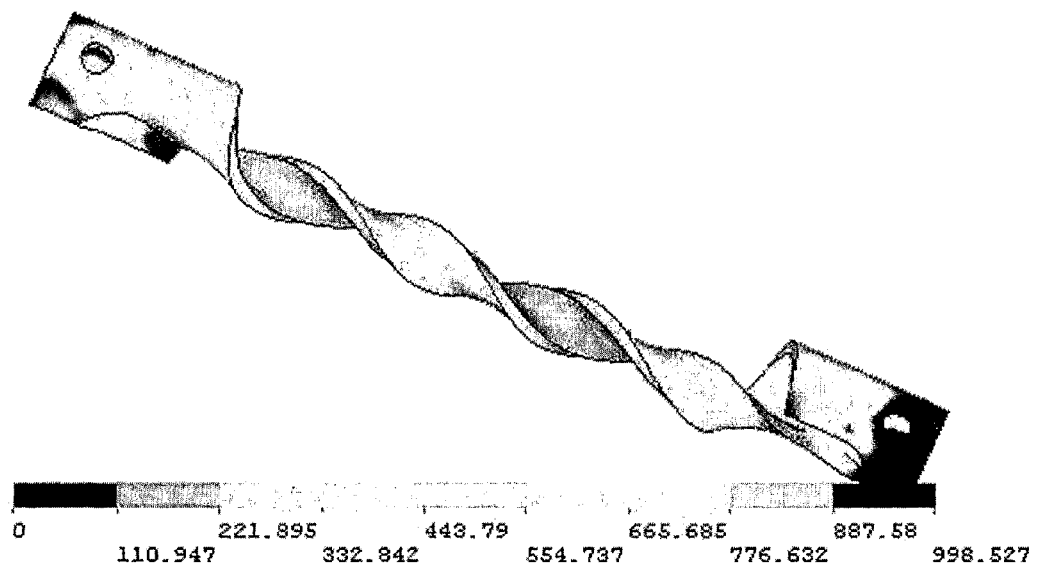

The preferred embodiment of the current invention consists of a coiled member similar in form to a spring, as shown in FIGS. 1A-E. The retaining holes 101 are used to install the member 100. In the embodiment of FIGS. 1A, 1B a varying cross section 103 is employed. The member 100 is designed for use in tension, and will deform plastically when a high enough force is applied to it. (The "plastic" regime refers to a range of stress for which deformation without subsequent retraction will occur, as opposed to the spring-like "elastic" regime of stress wherein a body will generally return to its original configuration.) When this stress level is met or exceeded, a deformation of the member will occur as shown in FIGS. 2A, B. This deformation consists of an 'unwinding' of the device along the helical cut 105. To relieve the twist undergone by the device as well as relieving the stress concentration at the end of the helical cut, strain relief slots 102 (FIGS. 1A, 1C) are employed in the preferred embodiments. Other forms of provision for stress relief will be obvious to one skilled in the art. Furthermore it is within provision of the invention that rotation of the energy absorbing member either be prevented or allowed to a predetermined degree, therefore allowing control over the force-vs.-travel curve of the device.

It should be understood that the plastic deformation region is only reached when the force applied to the energy absorbing element is greater than a certain threshold. When the applied force exceeds this threshold, only the threshold force is transmitted by the device to the rest of the system it is protecting. This threshold force can be fixed by varying the cross section of the device, or after a given wall thickness has been produced, by varying the pitch of the helical cut 105. The helical cut 105 can be carried out after mass production of the mechanisms, allowing parameters of the device such as ultimate travel length and threshold reaction force to be varied according to need, after mass production of the energy-absorbing element. Another advantage of the current invention over the prior art is that the rest of the system is reusable. The energy absorbing device is the only part to experience plastic deformation; this device can be replaced.

Figure 3:
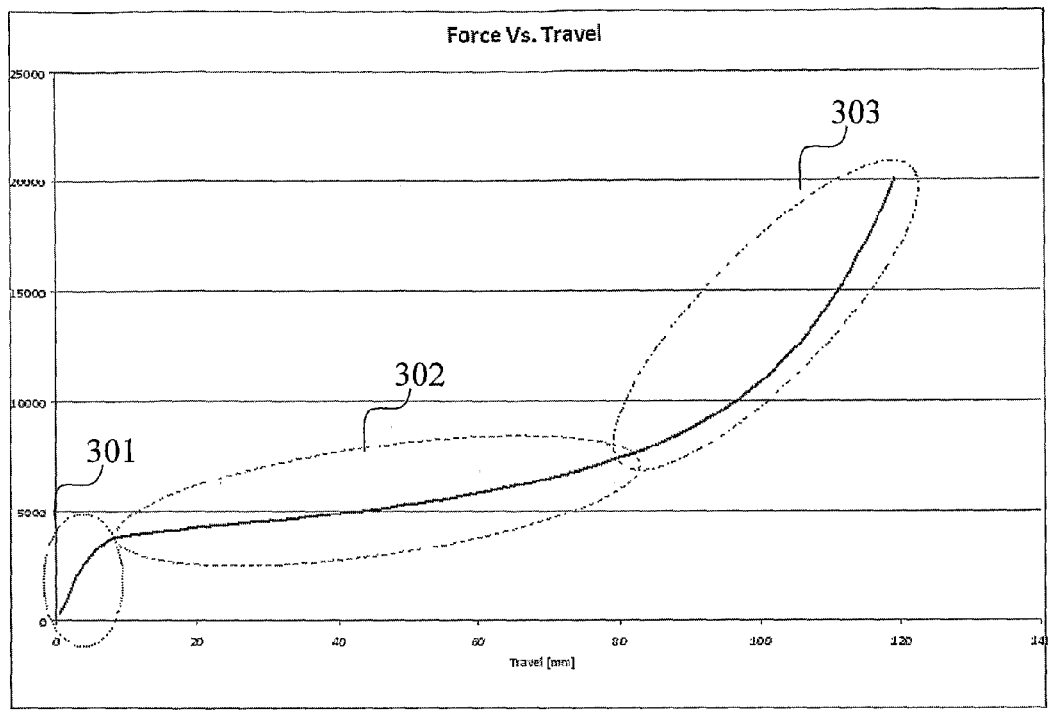
FIG. 3 is an exemplary graph of the force (y-axis, in Newton) vs. travel (x-axis, in mm) of one embodiment of the energy absorbing component of the current invention.

With reference to FIG. 3, one can appreciate the different regimes of the force vs. travel curve of the energy-absorbing member of the current invention. In the elastic regime 301 the device behaves in a spring-like fashion, with a linear relation between applied force and travel, and with return of the element to its original configuration after removal of the applied force. In the plastic regime 302, which is reached rather quickly [after little travel], the force one can apply to the element remains largely constant, rising only slightly with continuing deformation of the energy-absorbing member. In the end regime 303 the force increases more and more rapidly with continuing displacement. The characteristic of a short elastic regime and a plastic regime lasting the maximum length of travel allowable is desirable in this system, since this way almost no travel is 'wasted' without providing a reaction to the applied force. Furthermore nearly the entire travel provides the almost the exact required reaction force, as calculated in the theoretical design, as shown in the graph (FIG. 4B). Obviously this graph is appropriate to a particular embodiment and other graphs will be desirable in different situations (such as different mounting points—wall or floor, different expected acceleration range, and the like). The plateau region of the graph has the desirable effect of transmitting the force of the impact without causing injury, while absorbing as much impact energy as theoretically possible, decreasing the probability of a sudden injurious acceleration when the device reaches the end of its travel. This sudden acceleration would occur if not enough impact energy was absorbed; it is for this reason that the maximum allowable acceleration should be transmitted, without exceeding this amount. It will be appreciated by one skilled in the art that the relation depicted in FIG. 3 is non-trivial and quantitatively different from the force-displacement curve one would obtain with a simple metallic rod, spring, or the like. It should also be appreciated that the exact form of the curve, including the maximum travel, and the value of the applied force during the plastic regime, can both be tuned easily by changing the length of the energy-absorbing device, the pitch of the helical cut, the cross section size and shape, material, installation method, and design of the mechanical system into which the energy-absorbing element is placed.

The absorbing component is made of a plastic-deformable material such as but not limited to low carbon steels, stainless steels, composite materials, etc. The preferred embodiment of the energy absorption component takes a helical spring-like form, designed to experience plastic deformation over a desired deformation length, under a desired impact load threshold. The operating characteristics [namely the stress-strain curve, and thus the deformation length impact load threshold and acceptable load range for the system to be protected] of the mechanism can be controlled by the following parameters:

1. Element cross section shape and thickness;
2. Winding pitch [number of revolutions per length];
3. Length; and
4. Material A device incorporating one or more of the energy absorbing components of the current invention will also be tunable by changing the number of energy absorbing components used and the mechanical design of the system into which the energy absorbing component(s) is/are placed.

One advantage of the invention is that it can be installed as part of an add-on component to an existing, original vehicle seat. The solution can be tailored to fit several different types of seats and vehicles, and as described above, different impact load behaviors can be easily arranged. The device parameters are affected by several factors including: platform structure and weight; available clearance from the floor; and maximum expected charge size, etc.

Figure 4A:
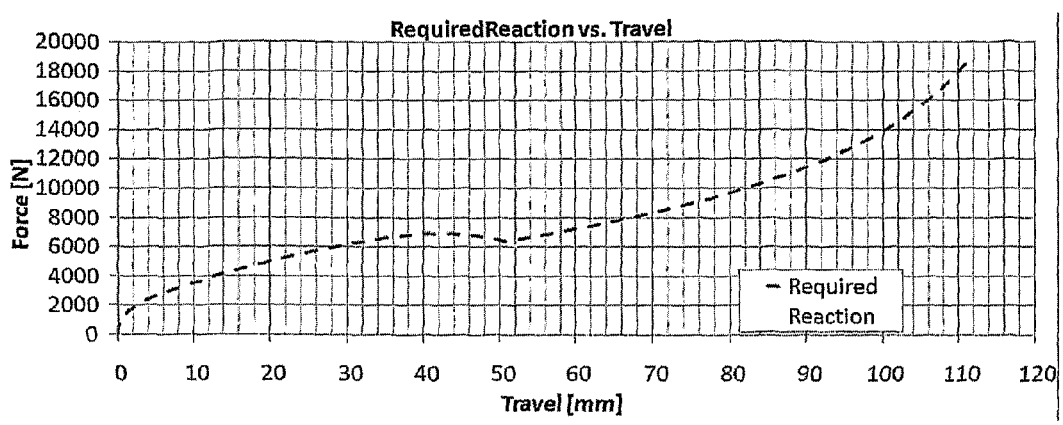
FIG. 4A is an exemplary graph of the necessary force vs. travel required of an energy absorbing component to cause an output acceleration within the allowable parameters given by the human body endurance graph, for an occupant of average weight, when installed in a standard four-bar mechanism.
Figure 4B:
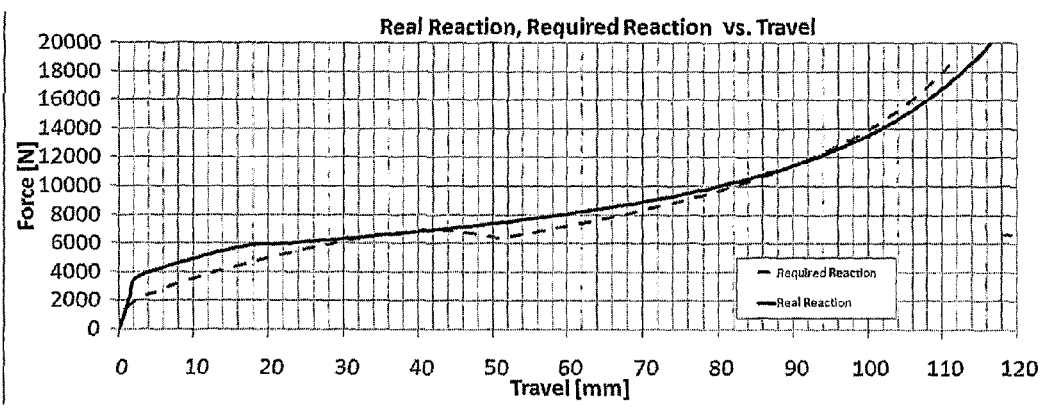
FIG. 4B superimposes the curves of FIG. 3 and FIG. 4A for purposes of comparison.
Figure 5A:
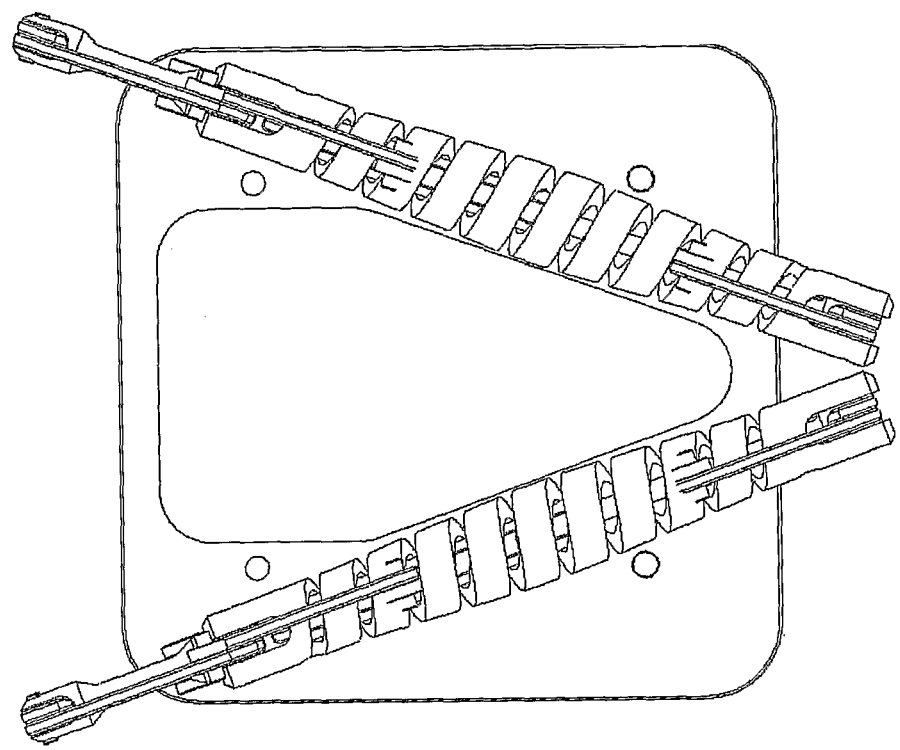
FIG. 5A is a schematic top view of an exemplary configuration of the energy absorbing components of the current invention installed in a seat support, with the top plate removed for ease of viewing.
Figure 5B:
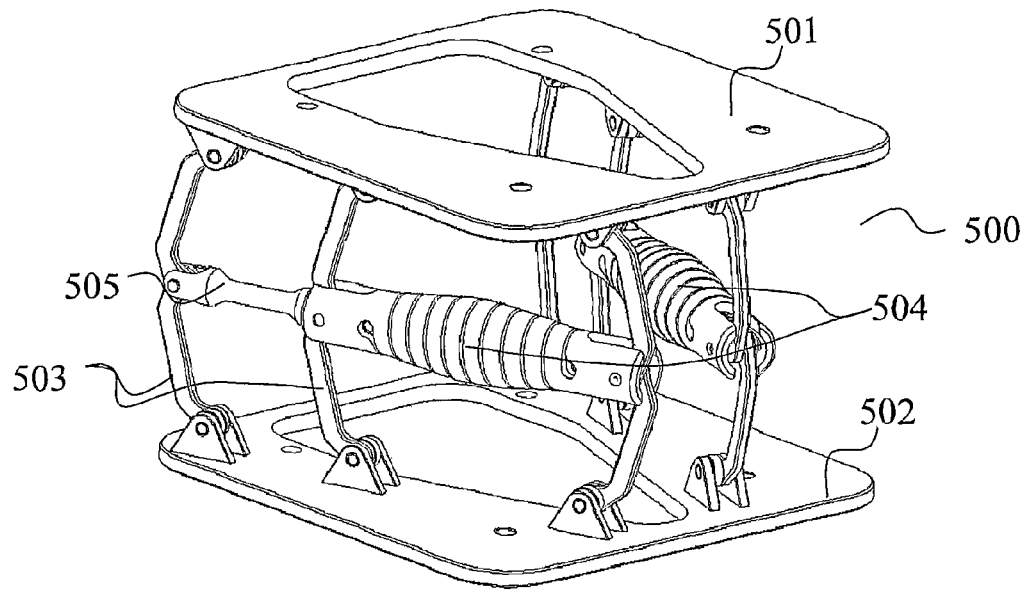
FIGS. 5B, C are isometric views of an exemplary configuration of the energy absorbing components of the current invention installed in a seat support before and after experiencing a sudden acceleration above a predetermined design value, respectively.
Figure 5C:
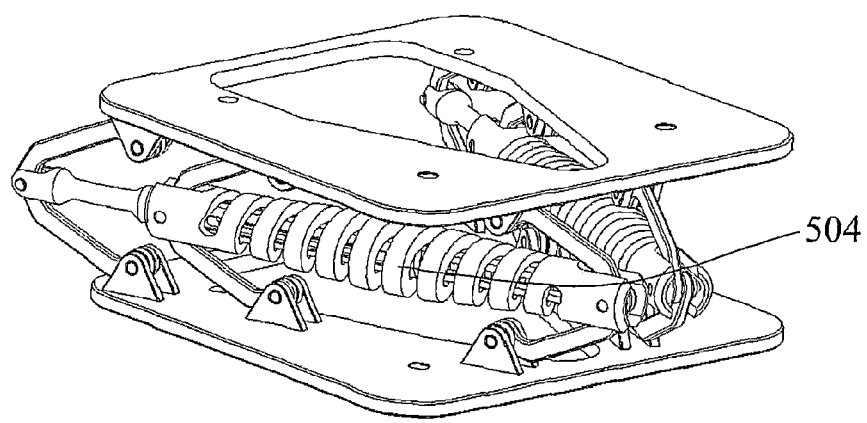

When placed in a four-bar assembly such as that of FIGS. 5 and 6, the force-displacement curve of the energy-absorbing element required to produce the desired force-displacement curve on the seat and occupant will take the form shown in FIG. 4A. A comparison of the desired profile of FIG. 4A with the actual (measured) profile is shown in FIG. 4B. One sees that the profile provided is nearly exactly the theoretically desired curve. This verifies the correct operation of the device as can be determined by simulation.

Figure 4C:
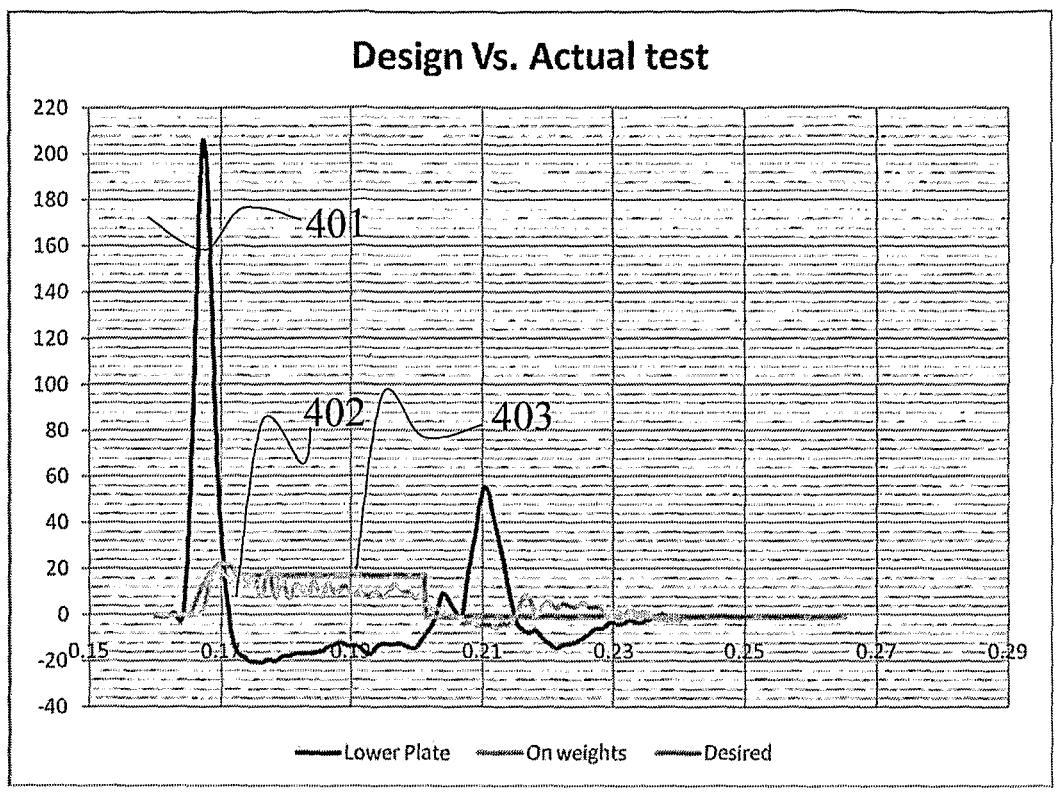
FIG. 4C superimposes desired and actual accelerations for purposes of comparison.

For 'real' proof of correct operation, the device must be tested under actual impact. The device is placed into a test fixture that impacts the device with a predetermined load. The test fixture measures input and output accelerations and records them. The correct operation of the device under actual impact is shown clearly in the experimentally measured curves of FIG. 4C. Here both the measured input acceleration 401 (e.g. that the vehicle body experiences) and the measured output acceleration (of the seat and passenger) 402 are shown vs. time, with the design output acceleration vs. time 403 also shown for reference. The y-axis is acceleration in g's while the x-axis is time in seconds. It is clear from this figure that the enormous acceleration experienced by the vehicle (a half-sine of approximately 205 g's and 0.005 s duration) is decreased by more than an order of magnitude, to the non-injurious level of approximately 22 g over 4 mSec dropping to a steady 17 g over the subsequent 0.03 s (likewise a non-injurious combination of acceleration and duration). It is also clear that the system performs rather close to design, which was accomplished by careful simulation using commercial and custom finite-element codes. The particular embodiment of the system shown is able to deal with occupant weights between 116 lbs. and 240 lbs., which is a range of weights that includes more than 90% of the entire population (from greater than the 5th percentile woman to lower than the 95th percentile man.)

A subtle effect of the force-displacement curves of FIGS. 3 and 4A-C is now discussed. It will be noted that in the 'plateau' section of the curve, e.g. section 302 of FIG. 3, has a slight rise. This has the effect of tailoring the response of the system to accommodate occupants of different weights, in the following way. A heavy person and a light person sitting on the same attenuating device will experience different behaviors. We take the example of a system that has been designed for a nominal weight of 105 Kg (231 lbs, occupant and equipment). We assume that the damped reaction of system delivers an acceleration to the 105 Kg occupant of 17 g over the entire reaction travel of 100 mm. A heavier person in the same chair arriving at a final weight (occupant and equipment) of 128 kg for example would experience 14 g for 121 mm and a lighter person could experience 20 g for 85 mm, as can be determined from Equation 1. Another way to express this capability of the system is that the dynamic response changes with the dynamic force; in practice, both heavy and light passengers are well protected by the system. This is by no means an obvious or naturally-occurring capability of such a system, since generally if the system is designed for heavy occupants, light occupants will be too-highly accelerated, and if the system is designed for light occupants, heavy occupants will be not be accelerated sufficiently and will run out of travel before reaching final velocity, resulting in a sudden impulse (shock) at the end of travel.

Therefore, a system which becomes somewhat stiffer with increase in travel is advantageous since only the heavier occupants experience the end of the travel. These heavier occupants are the ones who must undergo a larger change in momentum in order that their velocity reaches its final value. Therefore delivering greater force to heavier occupants at the end of the travel has the effect of reducing the ultimate travel difference between heavier and lighter occupants, in essence allowing the same system to better accommodate both heavy and light occupants. Variation of load profile is in fact known in the literature, and is referred to as Variable Load Energy Absorption or VLEA. However such systems are generally tuned, either beforehand or automatically, to a particular occupant weight, and will be found to be considerably more complex than the solution of the present invention. The Fixed Load Energy Absorber or FLEA, on the other hand, provides no such control and therefore suffers from the problem described above, namely that it is adequate for a small occupant weight range and inadequate for occupant weights outside this range. By providing a load profile as in FIG. 3 that increases load with travel, the current invention in fact provides an advanced energy absorber (AEA) with a minimum of mechanical complexity.

Another useful aspect of the system lies in the fact that due to the plastic deformation of the energy absorbing element(s), rebound is minimized (unlike the case for example if using a spring, which after being compressed/extended will tend to return to its initial state). Rebound energy is absorbed by further distortion of the energy absorbing element, generally into an S-shape. This is a very useful characteristic since the added acceleration of any rebound forces will increase the danger to the occupant. In fact the energy absorbing device of the invention has a tendency to absorb any rebound due to the rest of the system since even after being stretched to its maximum extent, it tends to resist being pushed back to a less-stretched position. In practice it becomes bent into an 'S' shape that will resist compression to some degree and absorb the rebound forces of the system.

Reference is now made to FIGS. 5A, B, C. In this figure the energy-absorbing element is implemented as a component of a seat base. A top view is shown in FIG. 5A, without the top plate. In 5B, C the full system is seen in perspective. The seat base 500 supports a seat [not shown] upon the seat plate 501 and is attached to the floor with floor plate 502. The vertical range of motion of the device allows the occupant to experience a lower acceleration than that experienced by the vehicle. This vertical displacement is converted into a linear motion of the energy absorbing elements of the current invention 504, preferably using four-bar assemblies 503. The absorbing component is integrated into the mechanism leading axes 505, or aligned between any two points of the assembly that are apart from each other when the system is loaded. As described above the absorbing component is forced into a plastic axial deformation under a hazard impact threshold.

In order to deal with side loads, the preferred embodiment is to install at least two collapsible mechanisms with integrated absorbing components in a non-parallel orientation (as in FIGS. 5A, B, C). Other embodiment can also be applied with only one absorption component integrated into a mechanism structure that is designed to stand multi-directional loads, as known in the art.

The seat mechanism may be installed either directly on the vehicle floor by means of bottom plate 502 or an additional bracket (not shown), or connected to preferable positions on the platform, e.g. side walls. This embodiment is common amongst crash protection mechanisms for military and aircraft applications since in those situations (vertical impact from crash landing or mine) the floor of the vehicle will experience the greatest loads. The sides of the vehicle will experience a lesser load due to energy absorption of the vehicle floor which will act to dampen the impact and reduce the impulse delivered to the rest of the vehicle. Thus from the standpoint of energy delivery, it is advantageous to attach the seats to the side or even roof of the vehicle, these being points as far as possible from the point of impact. On the other hand from the standpoint of installation practicality, it may be advantageous to install the seat on the floor of the vehicle. It will be appreciated by one skilled in the art that the present invention allows for all of these installation options. In particular the large degree of energy absorption of the current invention allows for installation on the floor while still delivering allowable accelerations to the seat occupant. An advantage of the current invention for floor installation is that it uses the same volume that normal floor installation for a chair uses, according to human engineering standards.

Figures 6A, 6B, 6C:
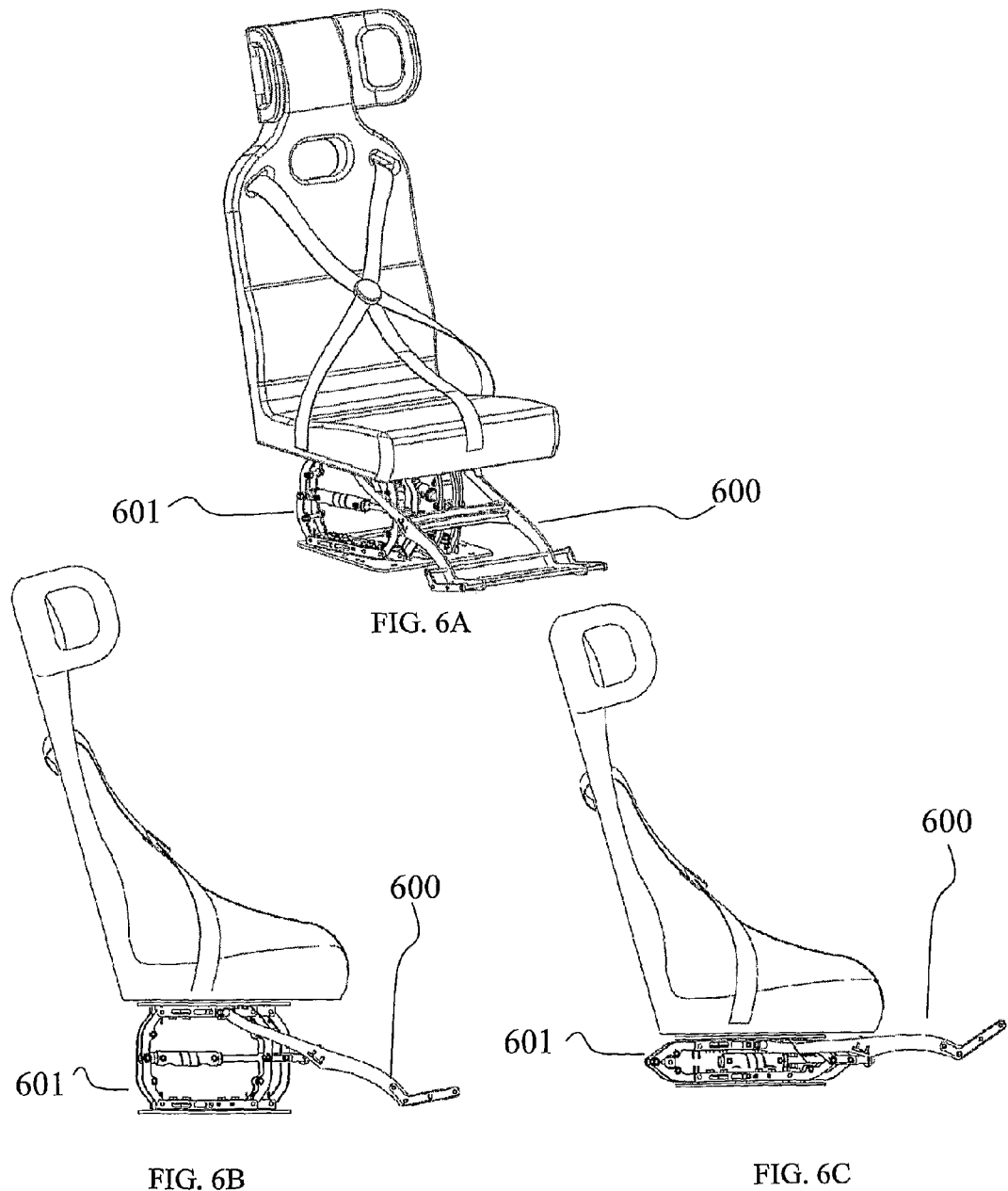
FIG. 6A is an isometric representation of a vehicle and/or aircraft seat incorporating the shock absorbing mechanism of the current invention before a shock is applied, installed with a foot-protection mechanism that is designed to lift the occupant's feet upwards when the mechanism is activated.
FIGS. 6B, C are representations of a vehicle and/or aircraft seat incorporating the shock absorbing mechanism of the current invention before and after a shock is applied, respectively.

In one embodiment of the seat mechanism, the mechanism includes a foot protection device 600 (refer to FIGS. 6A, B, C): The device is a construction upon which to lay the feet, that raises the feet away from the floor when the seat-protection device 601 is activated [when subjected to accelerations greater than the threshold], as shown in FIG. 6C. The foot support axes are preferably connected to top of the mechanism to minimize shock waves transference to the occupant's body. Unlike several instances in the prior art (e.g. U.S. Pat. No. 6,267,440 B1), the preferred embodiment of the foot support mechanism causes a natural motion of the legs upwards around the thigh-pelvis axis, rather than extending the shin forward. This is desirable since the space in front of the seat within most common vehicles is limited. Since many mine injuries such as broken/shattered bones in the foot and lower leg are due to the fact the passengers' feet rest on the floor during travel (and impact), this system will serve to greatly reduce the number and severity of these types of injuries.

Figures 7A, 7B, 7C:
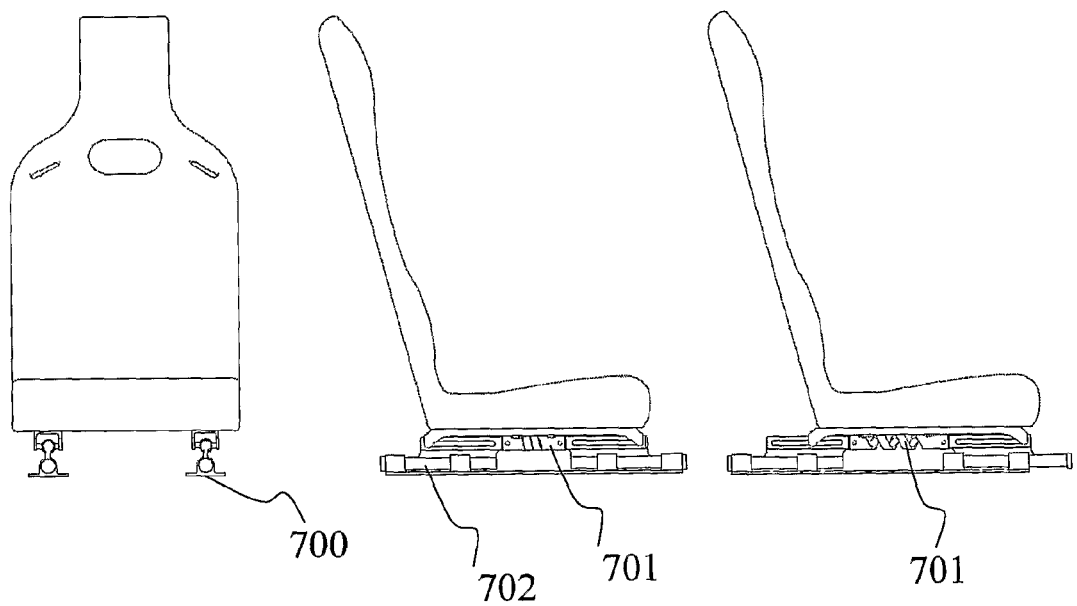
FIG. 7A is a schematic rear view of a horizontal embodiment for longitudinal restraint of a vehicle and/or aircraft seat incorporating the energy absorbing mechanism of the current invention.
FIGS. 7B, C are schematic side views of a horizontal embodiment for longitudinal restraint of a vehicle and/or aircraft seat incorporating the energy absorbing mechanism of the current invention, before and after a shock is applied, respectively.
Figure 8A:
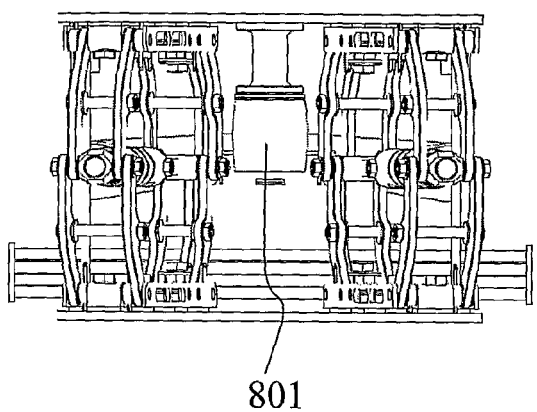
FIGS. 8A, B are schematic representations of a further embodiment of a vehicle and/or aircraft seat incorporating the energy absorbing mechanism of the current invention which incorporates an additional bumper.
Figure 8B:
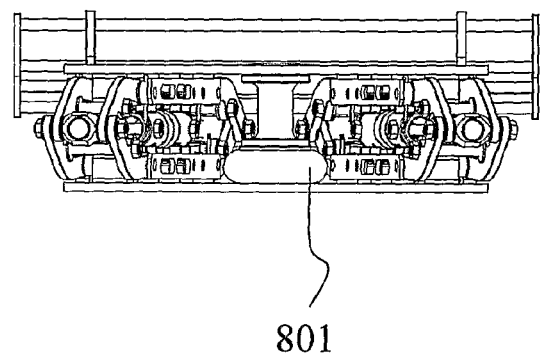

Explosions will produce a range of vibrations and shock waves onto the seat and absorption mechanism. In order to dampen high frequency vibrations and shock waves, it is preferable, but not mandatory, to isolate the joints and connections between mechanism parts with absorbing elastomers (that usually convert mechanical energy to heat) as known in the art. The energy absorbing component of the current invention can also be utilized to protect against mainly horizontal impacts, by installing it in a horizontal mechanism that allows horizontal travel of the seat while loading the absorption component when experiencing a horizontal (longitudinal or lateral) impact. FIG. 7 demonstrates such an application for horizontal restraining, based on a support rail 702. The absorption component 701 is installed between two support bars, each allowing only horizontal motion and preventing motion in the perpendicular directions. Any longitudinal impact would force one of the bars to pull the absorption component against the other. This is an exemplary embodiment of the use of the energy-absorbing component of the current invention. A variety of different implementations of the same absorption component will be obvious to one versed in the art. Restraint in any direction can be achieved by installing such energy absorbing components in appropriate directions, with auxiliary mechanisms as described here or as known in the art. In order to extend the safe range of applicable loads, elastic bumpers 801 can be installed as demonstrated in FIGS. 8A, B. These are not mandatory for the operation of the mechanism. The bumpers will come into play only at the end of the range of travel, and will modify the final section of the force-displacement curve, tending to further increase the load as a function of travel. This will tend to minimize the 'jerk' otherwise experienced at the end of the travel, where for instance two metal members finally meet, sending the load up dramatically and in effect causing a huge increase in acceleration.

Figure 10A:
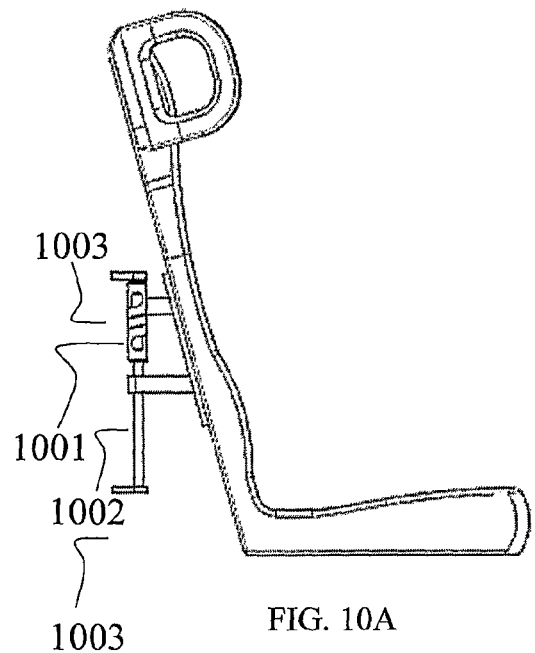
FIG. 10A-D are schematic representations of a further embodiment of a vehicle seat incorporating the energy absorbing mechanism of the current invention adapted for attachment to the side of a vehicle.
Figure 10C:
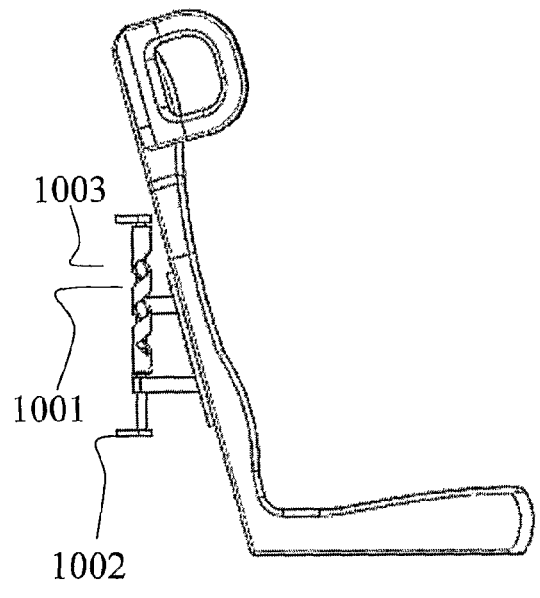
Figure 10B:
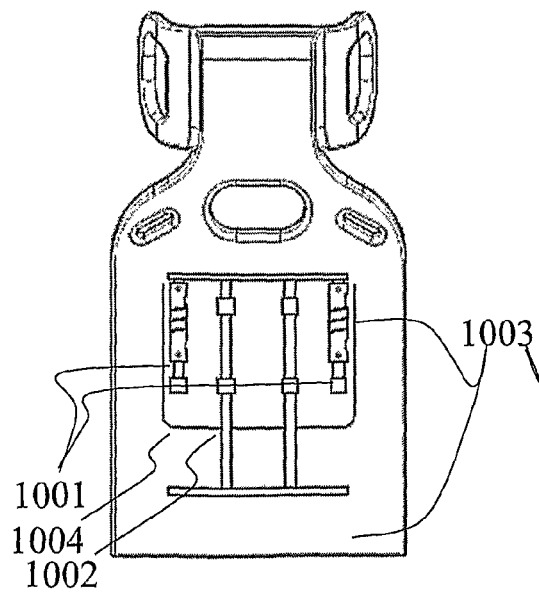
Figure 10D:
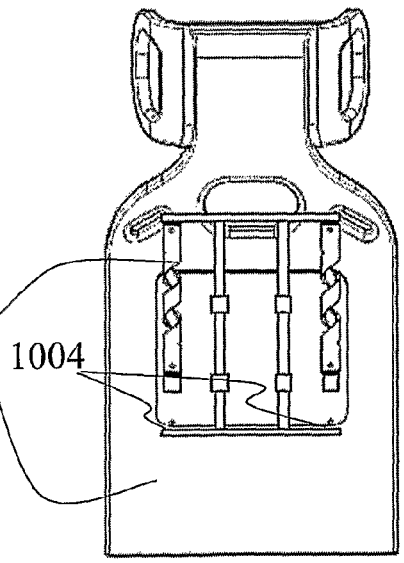

In FIGS. 10A-D an embodiment of the invention is shown wherein the seat is attached to the side wall of a vehicle. The device is attached to the vehicle wall at attachment points 1003 means of screws, bolts, clamps, or other methods as will be obvious to one skilled in the art. FIG. 10A shows the device from the back before impact while FIG. 10B shows the device from the side before impact. The attachment points 1004 attach the device to the seat, by way of the energy absorbing elements 1001. Brackets 1002 allow the seat to slide vertically when the energy absorbing elements 1001 stretch, as shown in FIG. 10C (side) and FIG. 10D (back).

In the wall mounted embodiment it will be found useful to use a self-aligning bearing in the brackets 1002, to center the rods held by the brackets while allowing some degree of 'give'. Since the spiral itself can be extended even if the forces are not completely tensional, the best embodiment of the wall mounted system should be assembled in a self aligning base of any kind, as known in the art. Other advantages of using a bracket of this sort are that it's simple, does not require accurate bearings or bases, and is cheap. The technique can be implemented in various ways; flexible components of any sort including rubber, silicone, Belleville springs and the like are suitable for such brackets.

Design advantages of seating systems incorporating the current invention include:
  Simplicity (a single energy-absorbing component is used with no internal structure or moving parts)
  Low cost
  Add-on solution for various seats and vehicles
  Low weight
  Minimal installation time and effort (may be field modified).
  Bi-directional restraint (both initial peak, and rebound).
  Integrated feet protection.
  Multi-directional protection (both horizontal and vertical dampening possible).

One should contrast the simplicity of the energy absorbing device of the current invention with (for example) a piston and cylinder system often used for shock absorbing systems. The piston and cylinder must remain coaxial for optimum performance of such a design; if due to explosion or other massive acceleration the piston and cylinder lose concentricity, the damping effectiveness will be decreased or lost entirely. In contrast the energy absorbing element of the current invention cannot become 'misaligned'. Any stresses not along the longitudinal axis of the element (such as a shear stress) will be largely absorbed by deformation of the element, and in any case will not impair the energy-absorbing and acceleration-limiting ability of the device.

It is a further provision of the invention that the seat upon which a vehicle occupant sits is provided with a level of cushioning that will tend to reduce vibration coming from vehicle motion (bumpy roads, tire imbalances, etc.) The four-bar mechanisms e.g. 601 of FIG. 6 have a certain degree, of 'give' due to the use of elastic retaining members (grommets, etc). This give has a tendency to absorb small accelerations such as those experienced by bumpy travel, unlike most other heavy-impact systems, which are indifferent to small accelerations and do not ameliorate them.

With reference to FIGS. A, B, C a floor-mounted embodiment of the present invention is shown. In FIG. A a front view is shown while in b a side view of the device is shown, and in FIG. C an isometric view is shown. The chairs are provided with a degree of cushioning foam 01 tending to further absorb small-amplitude accelerations and vibrations.

Figures 13A, 13B, 13C:
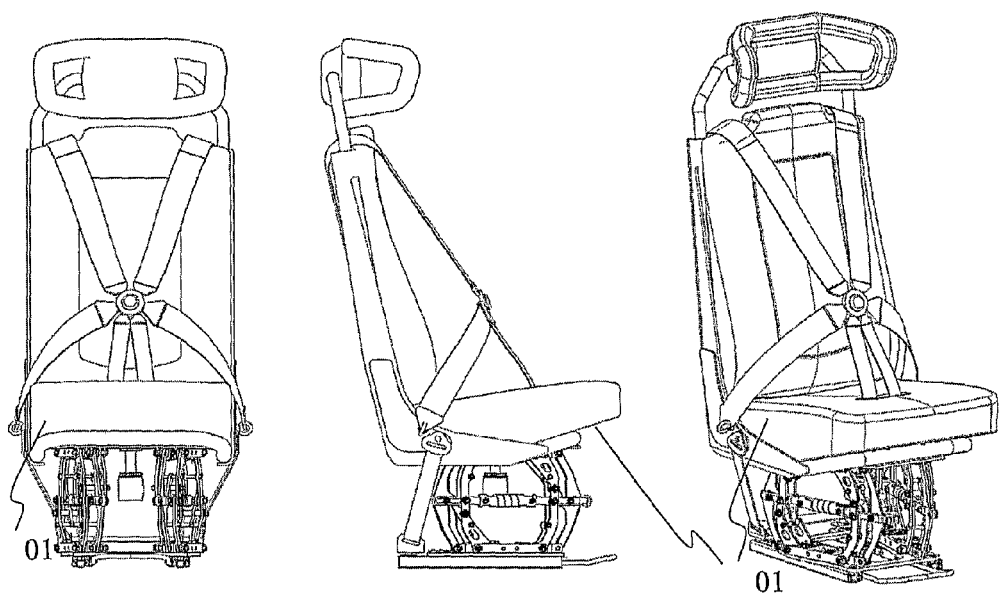
FIGS. 13A, B, C are front, side, and isometric views of an embodiment of the current invention.

The floor mounting mechanism is more fully shown in FIG. 13, where floor mounting plate 1401, seat mounting plate 1403, and energy absorbing member 1402 are visible. A rubber stop 1404 is provided to deal with the case that the device reaches the end of travel. The rubber stop will increase the reaction force of the device gradually with travel, decreasing the likelihood that the device will reach the utmost end of travel or beyond (which would result in metal-on-metal contact e.g. between top and bottom plates, and a sudden increase in reaction force.)

The wall mounting mechanism is more fully shown in FIG. The wall-mount plates 1501, 1503 attach the device to the wall of the vehicle. The chair-mount plate 1505 holds the chair in place. The energy absorbing member 1502 couples these two mounting points. The plates 1501, 1503 can slide on the cylinders 1504 during extension of the energy absorbing member 1502. A shear pin 1506 can be used to provide an initial spike in the load-travel profile, as in FIG. 16B. By causing a short but high-amplitude spike in acceleration, an extra degree of incoming momentum can be absorbed than would otherwise be possible, and if the duration is short enough (which may be judged for instance by reference to FIG. 9) an acceptably small injury risk is posed to the seat occupant.

Figure 14:
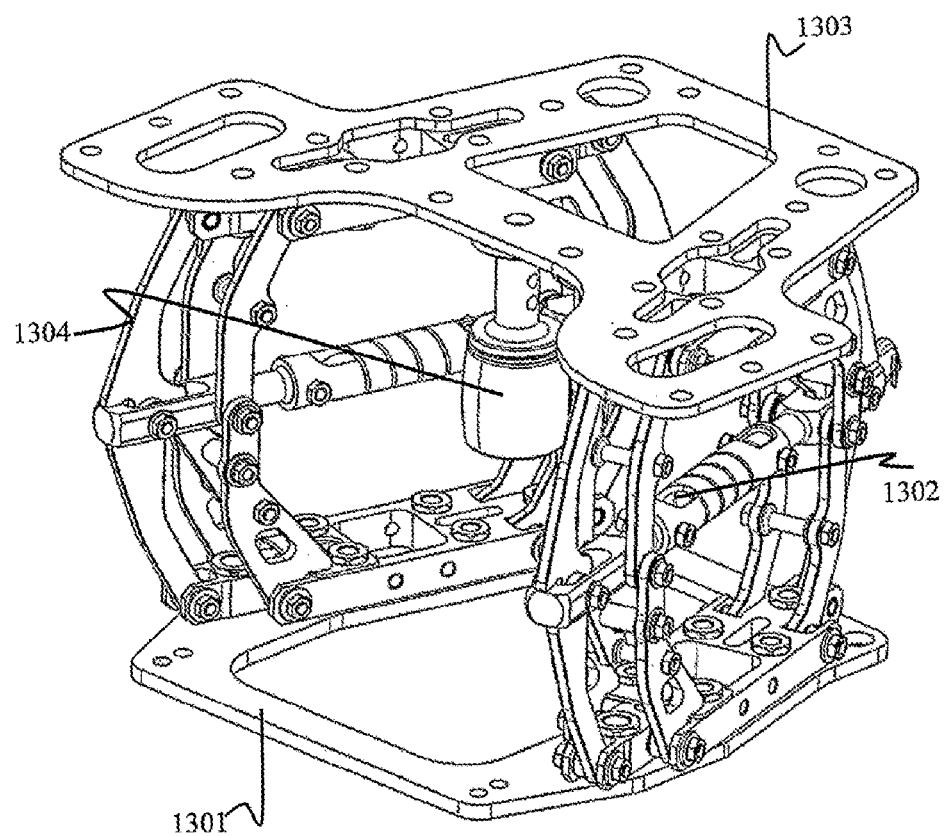
FIG. 14 is a detail of the floor mounting of the current invention.

The graph of FIG. 14 shows the system reaction in a "double-hit" scenario. The initial peak 1601 shows the acceleration from the blast and the second peak 1602 represents the slam down (i.e. where the vehicle hits the ground after being blown into the air by a mine). As you can see, the initial maximum acceleration reached almost 400 g for a period of 5.5 mSec and the DRI level 1603 is well below the allowed limit of 17.7.

Figure 15:
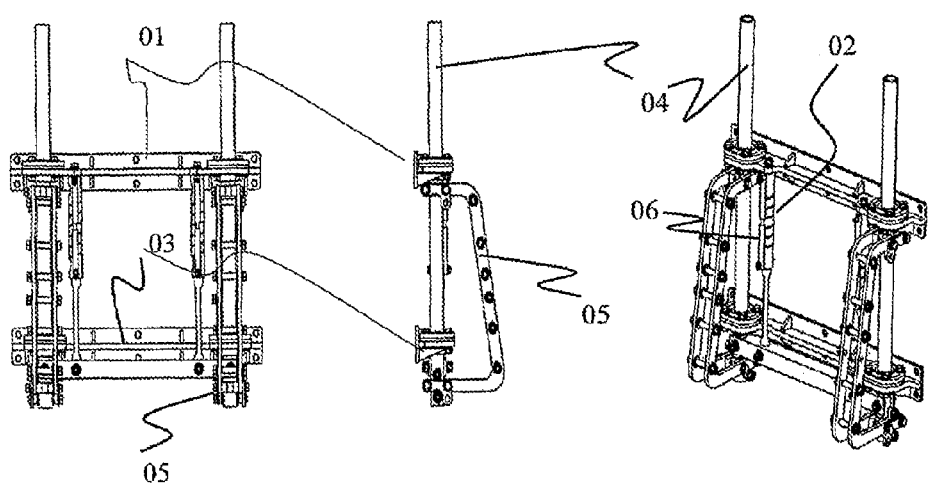
FIG. 15 is a detail of the wall mounting of the current invention.

The graph of FIG. 15 shows a "multi-hit" scenario. This test was performed in an unrestrained drop tower. The initial peak is 210 g's for a period of 5.5 mSec with consequent peaks 1702 of 80-100 g's. As one can see, the DRI level 1701 is very low.

One of the main challenges in designing a shock absorbing system is to be able to deal with various occupant weights. It is well known that occupants with different weights require different reaction from the system. It is also known that light occupants will suffer from high accelerations for a short stroke and heavy occupants will experience low accelerations for a long stroke. This is illustrated by the typical load-displacement curves of FIG. 16A, where the desired load (y-axis) vs. displacement (x-axis) is shown for three different occupant weights. It is desirable that heavier occupants be driven with a larger force by the shock attenuation system than lighter occupants. The greater mass of the heavier occupant will offset the greater force resulting in the same acceleration for heavy and light occupants. To achieve such results one approach is to provide a load-displacement curve that varies with displacement along the elastic regime, as in FIG. 16B. Here after an initial peak 1801, the load attains an initial plateau value 1802. After a certain amount of displacement the load increases to a second higher value 1803. The initial peak is useful since short accelerations of high amplitude are survivable (see FIG. 9) and will absorb some fraction of the impact energy.

Figure 16:
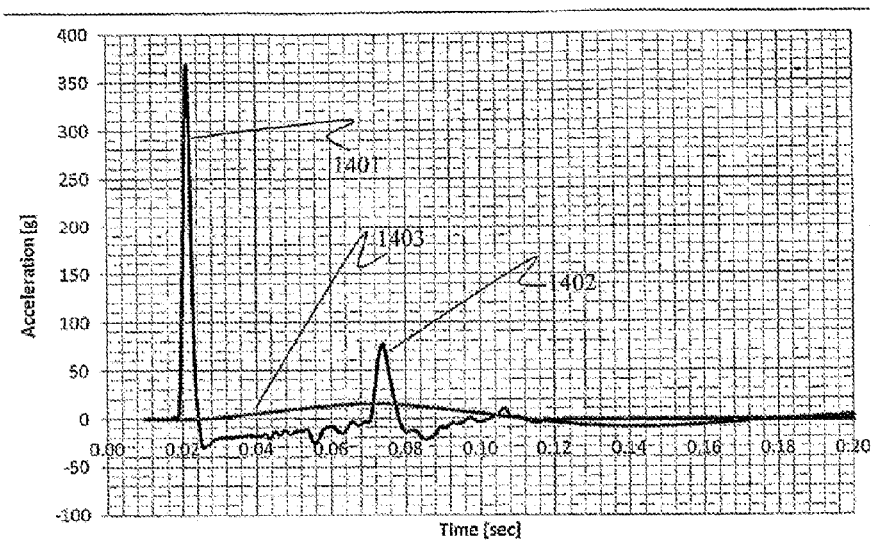
FIG. 16 presents a graph of the input and output accelerations of the current energy absorbing system for a shock-and-slam down event.

Current advanced systems attempt to deal with this requirement by designing a system with variable load-stroke profile as in FIG. 16B. Such systems are characterized by low force in the beginning of the stroke and high force in the end. Generally these so-called 'Advanced EA' systems are quite complex and expensive to manufacture. To accomplish such variable force curves the systems generally comprise intricate assemblies of several subsystems each having a different stroke-force characteristic. Obviously the complexity of such systems is a major disadvantage.

The Advanced system of the instant invention is based on the single energy-absorbing member already described. The load increases with the stroke as a natural result of the coiled or spring-like geometry of the device and the deformation characteristics of the material used. Thus, the system delivers acceptable accelerations to a wide range of occupants regardless of weight.

Since the system is based on a single component, it is highly reliable and repeatable. Environmental conditions have no affect on the system behavior. Dust, mud, oil, etc. do not influence it. The system will always react as planned and as manufactured. Other systems that involve the interactions between two or more parts generally are affected by frictional or viscous forces and are thus inevitably affected by environmental conditions such as temperature and infiltration of mud, sand, oil, high temperature gas, etc. that may clog, heat, or otherwise change the system before or during an explosion or other impact.

Figure 17:
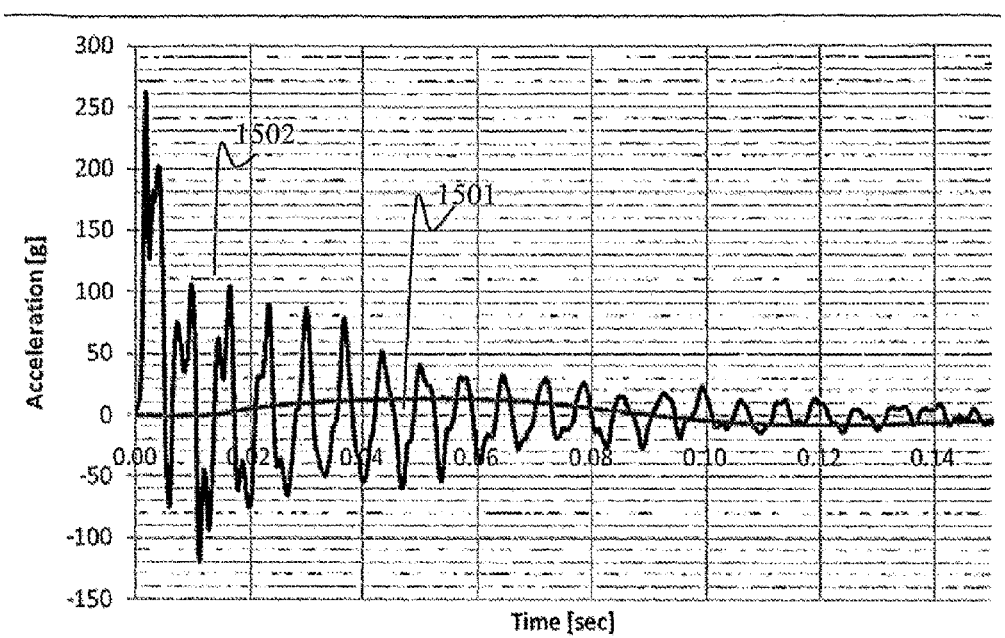
FIG. 17 presents a graph of the input and out put accelerations of the current energy absorbing system for a multi shock event.

The load-displacement curve of the instant invention shows the type of behavior discussed above. In FIG. 17 the load-displacement (aka force-travel) curve of the energy-absorbing element of the current invention is shown. The reaction force 1901 provided by the system of the current invention is around 4500N at the start of travel (after initial elastic deformation) and increases gradually to around 6500N after about 175 mm of travel. This change is gradual rather than sudden, eliminating 'jerk' ($d^3z/dt^3$). It should be pointed out that a wide range of load-displacement curves can be achieved by changing the system parameters (cross section, length, pitch, material).

In FIG. 18 a vibration analysis is shown. The x-axis is vibration frequency (in Hz or 1/s) and the y-axis is the vibration amplitude (in g, note logarithmic scale). The input acceleration 1802 is through most of the frequency range much larger than the transmitted acceleration 2001, and from the range of about 100 Hz-500 Hz the acceleration is damped by a factor of 10-100. This vibration damping is a consequence of a degree of 'give' built into the system and in general will not be provided by other impact protection systems unless special care has been taken. Such vibration damping will find use in long trips on bad roads (such as the Iraq countryside) in land vehicles or other vehicles such as combat helicopters, where continuous vibration may lead to fatigue and wear on passengers. Such analyses were carried out for various axes of vibration with similar results in all directions.

When installed in a seat-supporting mechanism as described above, the device prevents rebound that occurs naturally in some other systems, since after extending, the helix or spiral element of the current invention opposes not only tension but also compression forces, thus preventing the mechanism from bouncing back. An example of this in practice is shown in FIG. A-D. The white line 2101 has been superimposed upon the helical member of the invention for easier viewing of its deformation during impact. The first frame (a) shows the system before impact. The second frame (b) shows the system after initial impact and maximal stretching of the energy-absorbing element. The third frame (c)

shows the system after rebound, where the energy absorbing element has been deformed by rebound from a straight line into a more-or-less s-shaped curve. The fourth frame (d) shows the subsequent shape of the energy absorbing element. Just as deforming the element from initial to fully-extended configuration [from frame (a) to frame (b)] absorbs energy and limits the transmitted acceleration, deforming the element on rebound [from frame (b) to frames (c)-(d)] will likewise absorb energy and limit the transmitted rebound accelerations. The spiral element of the invention can repeat this scenario numerous times.

Figure 19:
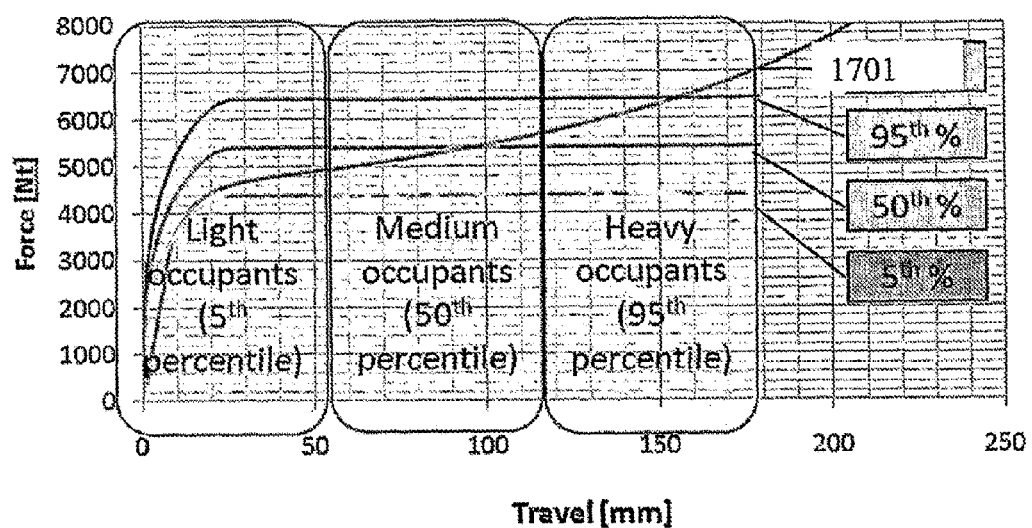
FIG. 19 presents a graph of different desired force-displacement curves for different weights along with the actual qualitative force-displacement curve of the present invention.
Figure 20:
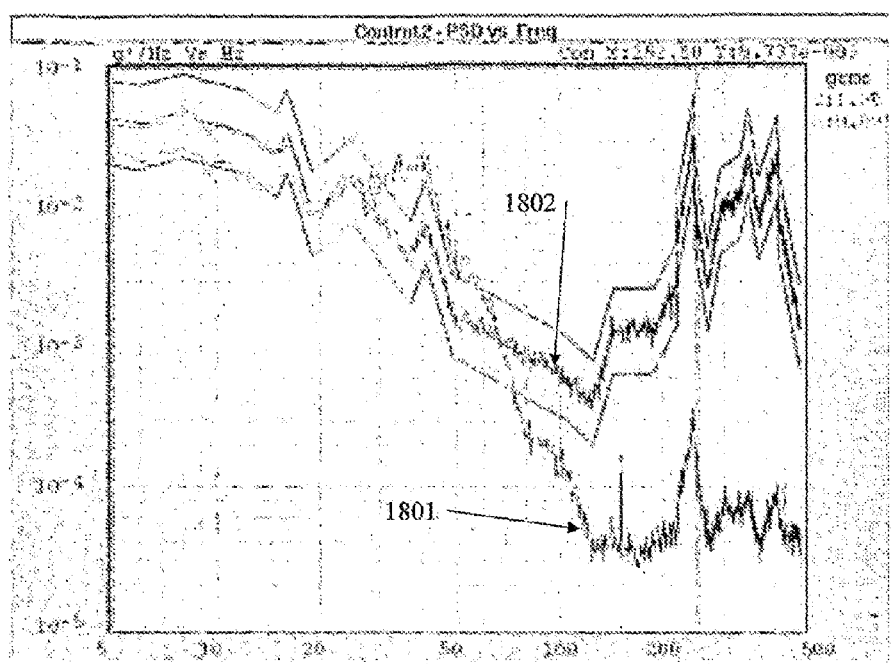
FIG. 20 presents results of a vibration analysis of the present invention with acceleration [in g] on the y-axis vs. vibration frequency [in Hz] on the x-axis.
Figure 21A:
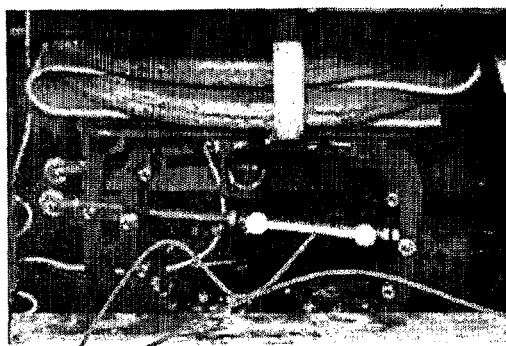
FIG. 21A-D presents a time sequence of a deceleration event using the energy absorbing system of the current invention.
Figure 21C:
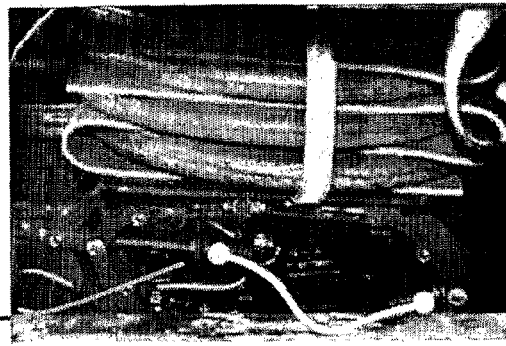
Figure 21B:
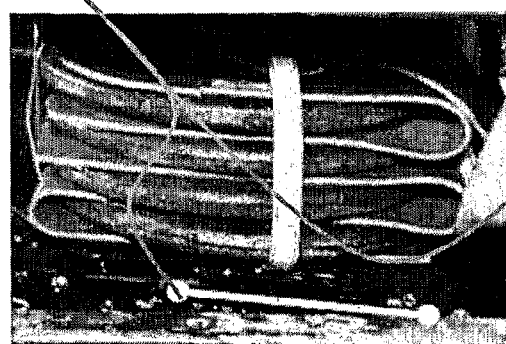
Figure 21D:
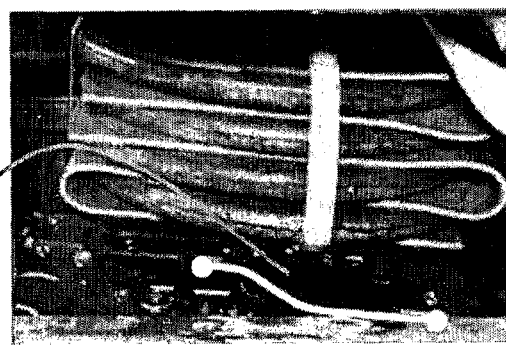
Figures 22A, 22B:
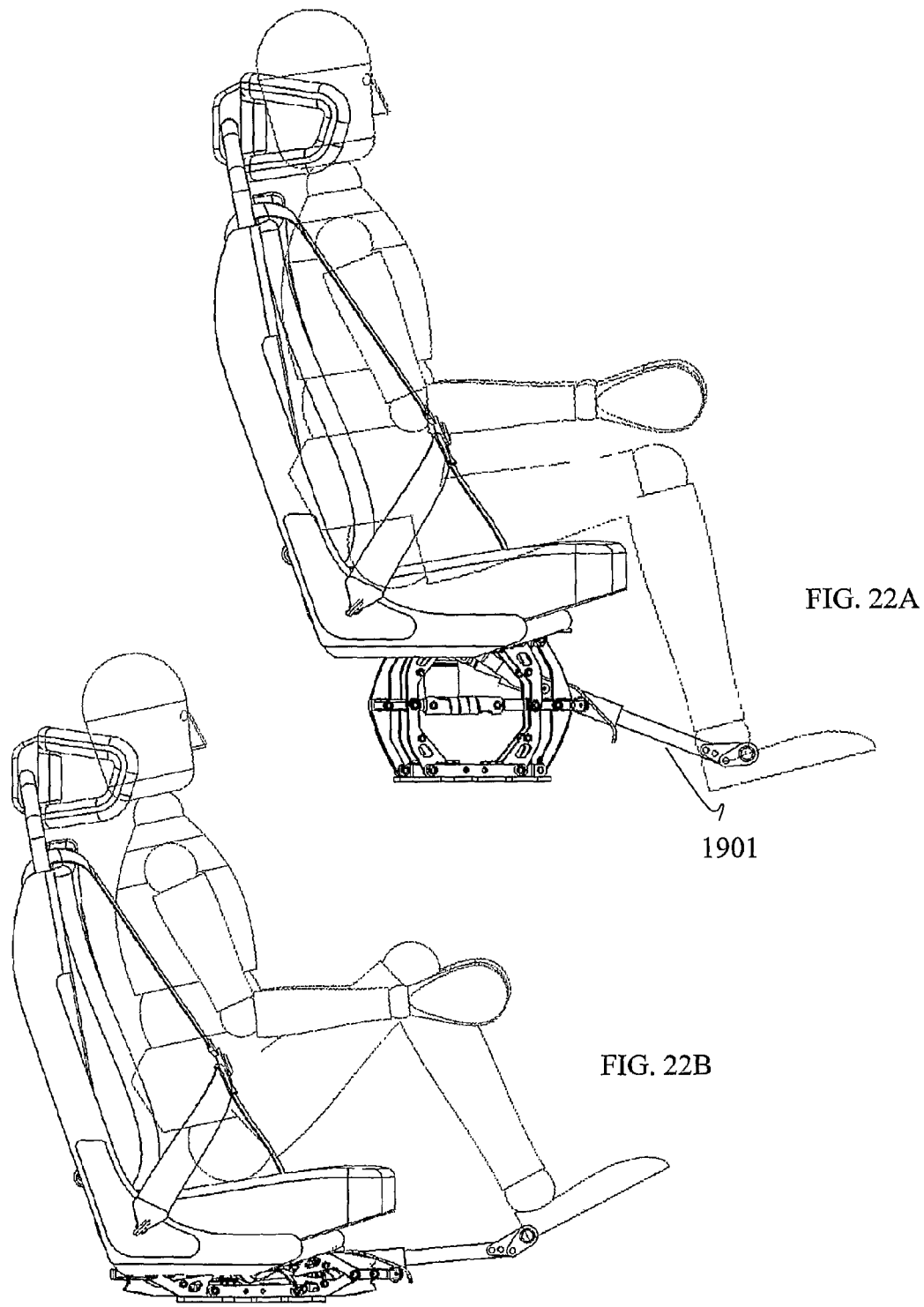
FIG. 22A-B presents side views of the energy absorbing system of a floor-mounted embodiment of the current invention with a deployable leg support.
Figure 23A:
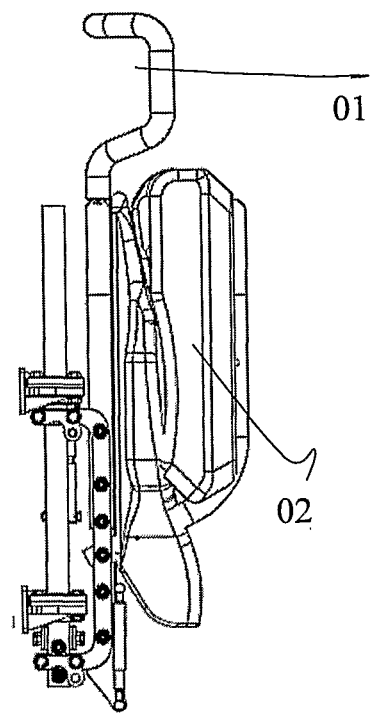
FIG. 23 A-B present side views of a wall-mounted embodiment of the current invention with collapsible seat and back.
Figure 23B:
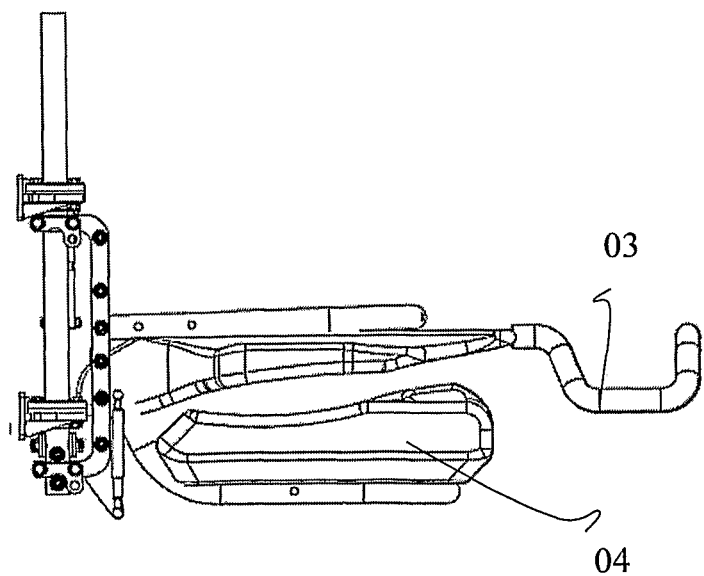

A further provision of the invention is a foot rest that keeps the occupant's feet off the floor. It is known that many non-lethal injuries such as broken or shattered foot and lower leg bones occur due to contact between feet and floor during vertical explosions. By simply removing the feet from contact with the floor one already avoids many such injuries. Further protection is provided by the current system by means of a retraction mechanism as shown in FIG. 19; in normal operation the mechanism 2201 is extended as in FIG. 19A. During impact, the mechanism is retracted as in 19B, further raising the feet away from possible floor deformation or rupture. This position has been found by NATO studies [NATO Research and Technology Organization (RTO) Final Report of HFM-090 Task Group 25] to be the optimal one for dealing with vertical impact to the feet and legs.

It is further within provision of the invention that the seat provided be foldable. Such folded configurations are shown in FIGS. A, B. The headrest may be folded from its deployed position 01 to a folded position 03 and the seat rest may be folded from an upright position 02 to a deployed position 04.

It is within provision of the current invention to converts hazardous vertical and longitudinal impact energy into a plastic deformation of a solid component, which is designed to react within a predefined impact load threshold.

It is within provision of the invention to provide a minimal safe range of motion, to allow the occupants to experience acceleration independent of the vehicle.

It is within provision of one embodiment of the current invention to dampen both vertical and horizontal accelerations, restricting accelerations transferred to the occupant to within safe limits.

It is within provision of another embodiment of the current invention to provide a foot protection mechanism that raises the occupant's leg from the floor when the system reacts to impact, forcing the legs upward around the thigh-pelvis axis.

It is within provision of another embodiment of the current invention to provide an absorption component that can be installed for mainly horizontal impacts, such as those experienced in head-on collisions.

In tests of the system (at the US Army Research Laboratory, MGA Michigan, Federal laboratories, and at the Israel Military Industries) and elsewhere it was found that performance criteria of the NATO Research and Technology Organization (RTO) Task Group 25, namely maximum DRI of 17.7, was met by an embodiment of the current system.

In fact performance was in most cases better than strictly required as seen in the following table:

| Description | Max. Velocity [m/sec] | Max DRI |
| --- | --- | --- |
| 5th percentile woman | 9.1 | 17.6 |
| 50th percentile male | 8.7 | 15.8 |
| 95th percentile male | 8.6 | 13.1 |

The invention claimed is:

1. A vehicle impact energy absorbing mechanism comprising:
    a cylindrical member characterized by a force-displacement curve having an elastic region and a plastic region,
    wherein a ratio between stretches of said cylindrical member at said plastic region and at said elastic region is in a range between about 4:1 and about 70:1,
    wherein said cylindrical member comprises a helical cut along an axis of said cylindrical member forming a helical ribbon deformable under an axial stress in expansion, and
    attachment means at ends of said cylindrical member.

2. The vehicle energy absorbing mechanism of claim 1, wherein a material of said cylinder is chosen from a group consisting of: metal, carbon fiber, composite material, plastic, elastomer; further wherein a cross section of said ribbon is selected from a group consisting of: rectangular, square, ellipsoidal, triangular, and circular.

3. The vehicle energy absorbing mechanism of claim 1, wherein said attachment means are selected from a group consisting of: holes bored in the ends of said helical cylinder, threads, and pressure clamps.

4. The vehicle energy absorbing mechanism of claim 1, further provided with strain relief provision at the ends of said helical cut selected from a group consisting of: boring holes at the ends of said helical cut, and adding additional revolutions of increased stiffness at the ends of said helical cut.

5. A device for protecting a vehicle seat occupant against vertical impacts, comprising:
    at least one cylindrical member characterized by a force-displacement curve having an elastic region and a plastic region, and comprises at least one respective helical cut along a respective axis thereof, forming at least one respective helical ribbon which is deformable under respective axial expansion;
    a mechanical linkage configured to transfer momentum from said vertical impacts into tension in said at least one helical ribbon; and
    attachment means for attaching a first region of said mechanical linkage to a vehicle seat, and attachment means for attaching a second region of said mechanical linkage to a vehicle body;
    wherein the at least one cylindrical member is configured to have a ratio in a range between about 4:1 and about 70:1 between expansion thereof in the plastic region and expansion thereof in the elastic region.

6. The vehicle energy absorbing mechanism of claim 1, wherein the plastic region comprises an end regime in which a force increase accelerates with growing displacement.

7. The vehicle energy absorbing mechanism of claim 5, wherein the cylindrical member is designed to have the force-displacement curve correspond to a given required reaction versus travel curve.

8. A method of attenuating an acceleration of a contained body due to impact upon a containing body, comprising:
    providing a cylinder;
    cutting said cylinder along a helical path to form a helical ribbon, said helical ribbon being adapted for plastic deformation in response to stresses greater than a predetermined threshold stress along an axis of said helical ribbon, wherein a force-displacement curve of said helical ribbon is characterized by an elastic region and a plastic region;
    providing attachment means at ends of said cylinder,
    controlling an ultimate displacement of said plastic deformation by varying a length and a helicity of said helical ribbon;

controlling the predetermined threshold stress by varying a cross section and a material of said ribbon; and limiting a stress transferred by said impact to said contained body by interposing said helical ribbon between said containing body and said contained body by means of said attachment means, wherein said step of limiting the stress comprises stretching said ribbon to maintain a ratio between a stretch of said ribbon in said plastic region and a stretch of said ribbon in said elastic region caused by said impact is in a range between about 4:1 and about 70:1, and wherein said step of limiting the stress comprises deforming said helical ribbon under an axial stress in an expansion manner.

9. The method of claim 8, wherein said material of said ribbon is selected from a group consisting of: metal, carbon fiber, composite material, plastic, elastomer; further wherein a cross section of said ribbon is selected from the group consisting of: rectangular, square, ellipsoidal, circular and, triangular.

10. The method of claim 8, wherein said attachment means is selected from a group consisting of: holes bored in the ends of said cylinder, threads, and pressure clamps.

11. A method of protecting a seat occupant against impacts, comprising:

providing a plurality of helical ribbons; said ribbons characterized, in response to tensions applied to the ribbons, by a force-displacement curve having an elastic region and a plastic region;

providing a mechanical linkage configured to transfer momentum from said impacts into tension in said helical ribbons;

providing first attachment means for attaching a first side of said mechanical linkage to a vehicle seat;

providing second attachment means for attaching a second side of said mechanical linkage to a vehicle body; and absorbing impact momentum by means of mechanical deformation of said helical ribbons due to said tensions applied to said helical ribbons, wherein said step of absorbing impacts comprises deforming the helical ribbons under an axial stress in an expansion manner.

12. A method of protecting a seat occupant against impacts, comprising steps of:

providing at least one helical ribbon having tubular ends, said at least one ribbon characterized, with response to tensions applied to the ribbons, by a force-displacement curve having an elastic region and a plastic region;

providing a mechanism configured to transfer said impacts into expansion of said at least one helical ribbon;

providing front attachment means for attaching a front tubular end of said at least one helical ribbon to a vehicle seat;

providing back attachment means for attaching a back tubular end of said at least one helical ribbon to a respective vehicle body; and absorbing impacts by means of expansion of said at least one helical ribbon, wherein a force of said impacts that is transferred to said vehicle seat is determined by the force-displacement curve of said at least one helical ribbon, wherein said at least one helical ribbon is arranged to undergo stretch deformation to maintain a ratio between a stretch of said at least one ribbon in said plastic region and a stretch of said at least one ribbon in said elastic region caused by said impacts in a range between about 4:1 and about 70:1, and wherein said step of absorbing impacts comprises deforming the at least one helical ribbon under an axial stress in an expansion manner.

13. A vehicle device for dissipating impact energy in a vehicular system in which, upon impact, a first system component is movable relative to a second system component, the device comprising:

a tubular member formed of a substantially plastically deformable material; said tubular member comprising a helical ribbon formed by a cut along a helical path upon the member;

a first connector associated with a first end of the tubular member, for attachment to the first system component; and a second connector associated with a second end of the tube opposite the first end, for attachment to the second system component.

14. The device according to claim 13, wherein the cut has a cut width.

15. The device according to claim 13, wherein at least one of the first connector and the second connector comprises an opening formed in a wall of the tubular member.

16. The device according to claim 13, wherein each of the first connector and the second connector comprises an opening formed in a wall of the tubular member.

17. The device according to claim 13, wherein at least one of the first connector and the second connector comprises a tab extending from the tubular member.

* * * * *